United States Patent
Liu et al.

(10) Patent No.: US 12,501,242 B2
(45) Date of Patent: Dec. 16, 2025

(54) VEHICLE-TO-EVERYTHING COMMUNICATIONS USING NETWORK CODING ASSISTED BY A RELAY

(71) Applicant: QUALCOMM Incorporated, San Diego, CA (US)

(72) Inventors: Kangqi Liu, San Diego, CA (US); Changlong Xu, Beijing (CN); Jian Li, Shanghai (CN); Liangming Wu, Beijing (CN); Hao Xu, Beijing (CN)

( * ) Notice: Subject to any disclaimer, the term of this patent is extended or adjusted under 35 U.S.C. 154(b) by 445 days.

(21) Appl. No.: 18/000,346

(22) PCT Filed: Jul. 14, 2020

(86) PCT No.: PCT/CN2020/101885
§ 371 (c)(1),
(2) Date: Nov. 30, 2022

(87) PCT Pub. No.: WO2022/011549
PCT Pub. Date: Jan. 20, 2022

(65) Prior Publication Data
US 2023/0209317 A1    Jun. 29, 2023

(51) Int. Cl.
*H04W 4/40* (2018.01)
*H04L 5/00* (2006.01)

(52) U.S. Cl.
CPC .............. *H04W 4/40* (2018.02); *H04L 5/0053* (2013.01)

(58) Field of Classification Search
CPC ...... H04W 4/40; H04W 92/18; H04L 5/0053; H04L 2001/0097; H04L 1/0076; H04L 2001/0093; H04L 1/18; H04B 7/15521
See application file for complete search history.

(56) References Cited

U.S. PATENT DOCUMENTS

| | | | |
|---|---|---|---|
| 9,350,440 B2* | 5/2016 | Jeon | H04L 1/1858 |
| 9,509,447 B2* | 11/2016 | Kim | H04L 1/0001 |
| 10,609,599 B2* | 3/2020 | Lehmann | H04W 28/04 |
| 10,791,558 B2 | 9/2020 | Santhanam et al. | |
| 2014/0369253 A1 | 12/2014 | Jose et al. | |

(Continued)

FOREIGN PATENT DOCUMENTS

| | | |
|---|---|---|
| CN | 102882642 A | 1/2013 |
| CN | 103297197 A | 9/2013 |

(Continued)

OTHER PUBLICATIONS

Supplementary European Search Report—EP20945493—Search Authority—Munich—Mar. 4, 2024.

(Continued)

*Primary Examiner* — Chandrahas B Patel

(57) ABSTRACT

Various aspects of the present disclosure generally relate to wireless communication. In some aspects, a user equipment (UE) may transmit, to another UE, a set of encoded packets associated with a vehicle-to-everything (V2X) communication, wherein the set of encoded packets are generated according to a network coding scheme, transmit, to a relay device, the set of encoded packets associated with the V2X communication, and receive, from the relay device, an acknowledgment message based at least in part on transmitting, to the relay device, the set of encoded packets associated with the V2X communication. Numerous other aspects are provided.

30 Claims, 15 Drawing Sheets

(56) References Cited

U.S. PATENT DOCUMENTS

| | | | |
|---|---|---|---|
| 2016/0205014 A1* | 7/2016 | Chen | H04L 43/0829 370/216 |
| 2019/0319749 A1 | 10/2019 | Cao et al. | |
| 2020/0022013 A1 | 1/2020 | Nguyen et al. | |
| 2022/0338172 A1* | 10/2022 | Yoshioka | H04W 72/20 |

FOREIGN PATENT DOCUMENTS

| | | | |
|---|---|---|---|
| CN | 105846958 A | | 8/2016 |
| CN | 107249203 A | | 10/2017 |
| WO | WO-2018031526 A1 | * | 2/2018 |
| WO | WO-2018070645 A1 | | 4/2018 |
| WO | 2018172136 A1 | | 9/2018 |
| WO | WO-2019070332 | | 4/2019 |
| WO | WO-2019191108 A1 | | 10/2019 |
| WO | WO-2020014348 A1 | | 1/2020 |
| WO | WO-2020102250 A1 | | 5/2020 |

OTHER PUBLICATIONS

International Search Report and Written Opinion—PCT/CN2020/101885—ISA/EPO—Apr. 19, 2021.
Palma V., et al., "A Fountain Codes-based Data Dissemination Technique in Vehicular Ad-hoc Networks," IEEE 27, 11th International Conference on ITS Telecommunications (ITST), Oct. 27, 2011, pp. 750-755.

* cited by examiner

VEHICLE-TO-EVERYTHING COMMUNICATIONS USING NETWORK CODING ASSISTED BY A RELAY

CROSS-REFERENCE TO RELATED APPLICATION

This application is a 371 national stage of Patent Cooperation Treaty (PCT) Application No. PCT/CN2020/101885 filed on Jul. 14, 2020, entitled "VEHICLE-TO-EVERYTHING COMMUNICATIONS USING NETWORK CODING ASSISTED BY A RELAY," which is hereby expressly incorporated by reference herein.

FIELD OF THE DISCLOSURE

Aspects of the present disclosure generally relate to wireless communication and to techniques and apparatuses for vehicle-to-everything (V2X) communications using network coding assisted by a relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting, to another UE, a set of encoded packets associated with a vehicle-to-everything (V2X) communication, wherein the set of encoded packets are generated according to a network coding scheme; transmitting, to a relay device, the set of encoded packets associated with the V2X communication; and receiving, from the relay device, an acknowledgment message based at least in part on transmitting, to the relay device, the set of encoded packets associated with the V2X communication.

In some aspects, a method of wireless communication performed by a relay device includes: receiving, from a first UE, a first V2X communication; receiving, from a second UE, a second V2X communication, wherein the first V2X communication and the second V2X communication are intended for a third UE; and transmitting, to the third UE, a set of encoded packets associated with the first V2X communication and the second V2X communication, wherein the set of encoded packets are generated according to a network coding scheme.

In some aspects, a method of wireless communication performed by a UE includes: receiving, from one or more other UEs, one or more sets of encoded packets associated with one or more V2X communications; receiving, from a relay device, a set of encoded packets associated with the one or more V2X communications; and decoding, according to a network coding scheme, the one or more sets of encoded packets associated with one or more V2X communications and the set of encoded packets associated with the one or more V2X communications to form a set of source packets associated with the one or more V2X communications.

In some aspects, a UE for wireless communication includes: a memory; and one or more processors operatively coupled to the memory, the memory and the one or more processors configured to: transmit, to another UE, a set of encoded packets associated with a V2X communication, wherein the set of encoded packets are generated according to a network coding scheme; transmit, to a relay device, the set of encoded packets associated with the V2X communication; and receive, from the relay device, an acknowledgment message based at least in part on transmitting, to the relay device, the set of encoded packets associated with the V2X communication.

In some aspects, a relay device for wireless communication includes: a memory; and one or more processors operatively coupled to the memory, the memory and the one or more processors configured to: receive, from a first UE, a first V2X communication; receive, from a second UE, a second V2X communication, wherein the first V2X communication and the second V2X communication are intended for a third UE; and transmit, to the third UE, a set of encoded packets associated with the first V2X communication and the second V2X communication, wherein the set of encoded packets are generated according to a network coding scheme.

In some aspects, a UE for wireless communication includes: a memory; and one or more processors operatively coupled to the memory, the memory and the one or more processors configured to: receive, from one or more other UEs, one or more sets of encoded packets associated with one or more V2X communications; receive, from a relay device, a set of encoded packets associated with the one or more V2X communications; and decode, according to a network coding scheme, the one or more sets of encoded packets associated with one or more V2X communications and the set of encoded packets associated with the one or more V2X communications to form a set of source packets associated with the one or more V2X communications.

In some aspects, a non-transitory computer-readable medium storing a set of instructions for wireless communication includes: one or more instructions that, when executed by one or more processors of a UE, cause the UE to: transmit, to another UE, a set of encoded packets associated with a V2X communication, wherein the set of encoded packets are generated according to a network coding scheme; transmit, to a relay device, the set of encoded packets associated with the V2X communication; and receive, from the relay device, an acknowledgment message based at least in part on transmitting, to the relay device, the set of encoded packets associated with the V2X communication.

In some aspects, a non-transitory computer-readable medium storing a set of instructions for wireless communication includes: one or more instructions that, when executed by one or more processors of a relay device, cause the relay device to: receive, from a first UE, a first V2X communication; receive, from a second UE, a second V2X communication, wherein the first V2X communication and the second V2X communication are intended for a third UE; and transmit, to the third UE, a set of encoded packets associated with the first V2X communication and the second V2X communication, wherein the set of encoded packets are generated according to a network coding scheme.

In some aspects, a non-transitory computer-readable medium storing a set of instructions for wireless communication includes: one or more instructions that, when executed by one or more processors of a UE, cause the UE to: receive, from one or more other UEs, one or more sets of encoded packets associated with one or more V2X communications; receive, from a relay device, a set of encoded packets associated with the one or more V2X communications; and decode, according to a network coding scheme, the one or more sets of encoded packets associated with one or more V2X communications and the set of encoded packets associated with the one or more V2X communications to form a set of source packets associated with the one or more V2X communications.

In some aspects, an apparatus for wireless communication includes: means for transmitting, to a UE, a set of encoded packets associated with a V2X communication, wherein the set of encoded packets are generated according to a network coding scheme; means for transmitting, to a relay device, the set of encoded packets associated with the V2X communication; and means for receiving, from the relay device, an acknowledgment message based at least in part on transmitting, to the relay device, the set of encoded packets associated with the V2X communication.

In some aspects, an apparatus for wireless communication includes: means for receiving, from a first UE, a first V2X communication; means for receiving, from a second UE, a second V2X communication, wherein the first V2X communication and the second V2X communication are intended for a third UE; and means for transmitting, to the third UE, a set of encoded packets associated with the first V2X communication and the second V2X communication, wherein the set of encoded packets are generated according to a network coding scheme.

In some aspects, an apparatus for wireless communication includes: means for receiving, from one or more UEs, one or more sets of encoded packets associated with one or more V2X communications; means for receiving, from a relay device, a set of encoded packets associated with the one or more V2X communications; and means for decoding, according to a network coding scheme, the one or more sets of encoded packets associated with one or more V2X communications and the set of encoded packets associated with the one or more V2X communications to form a set of source packets associated with the one or more V2X communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
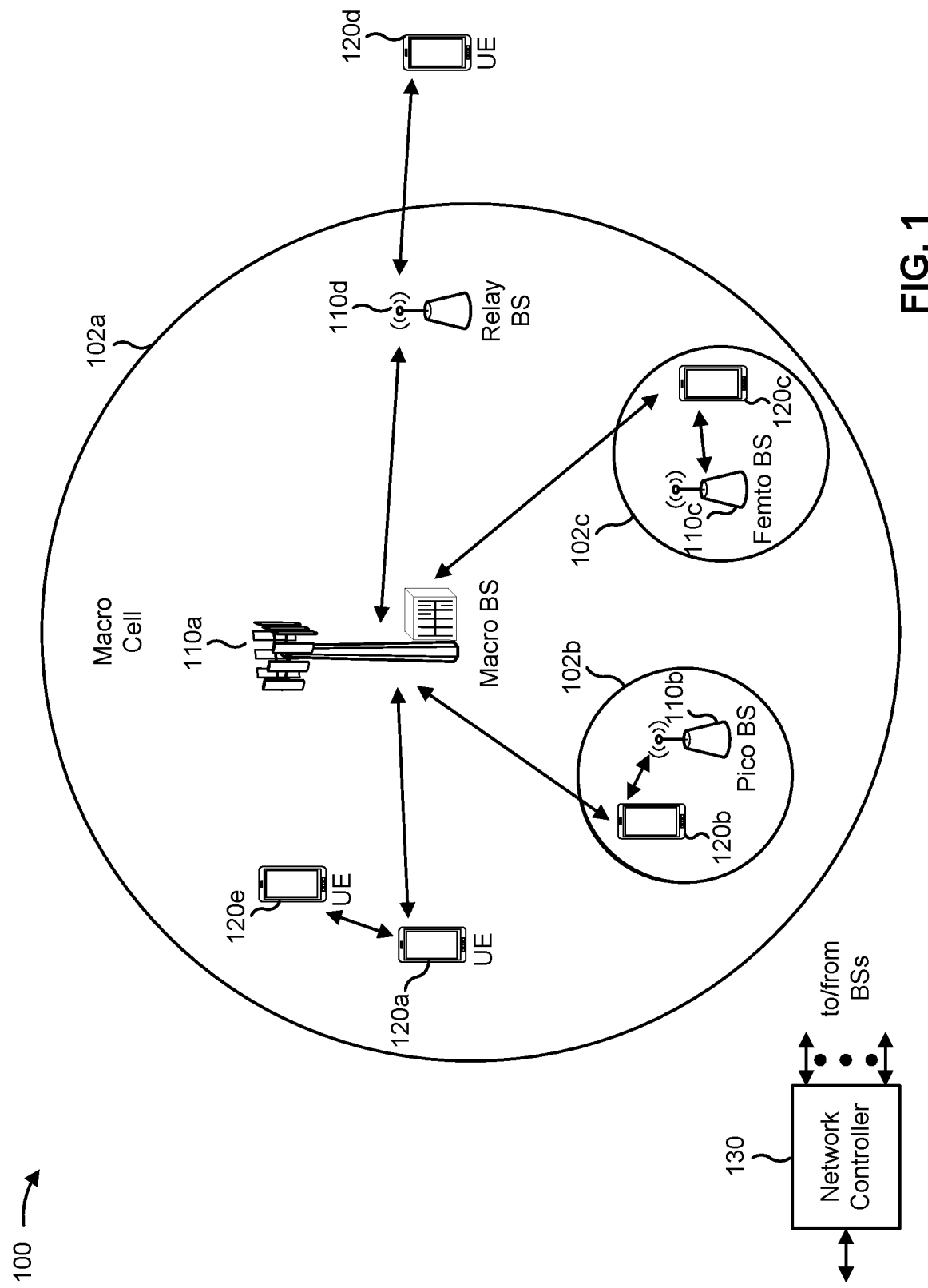
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
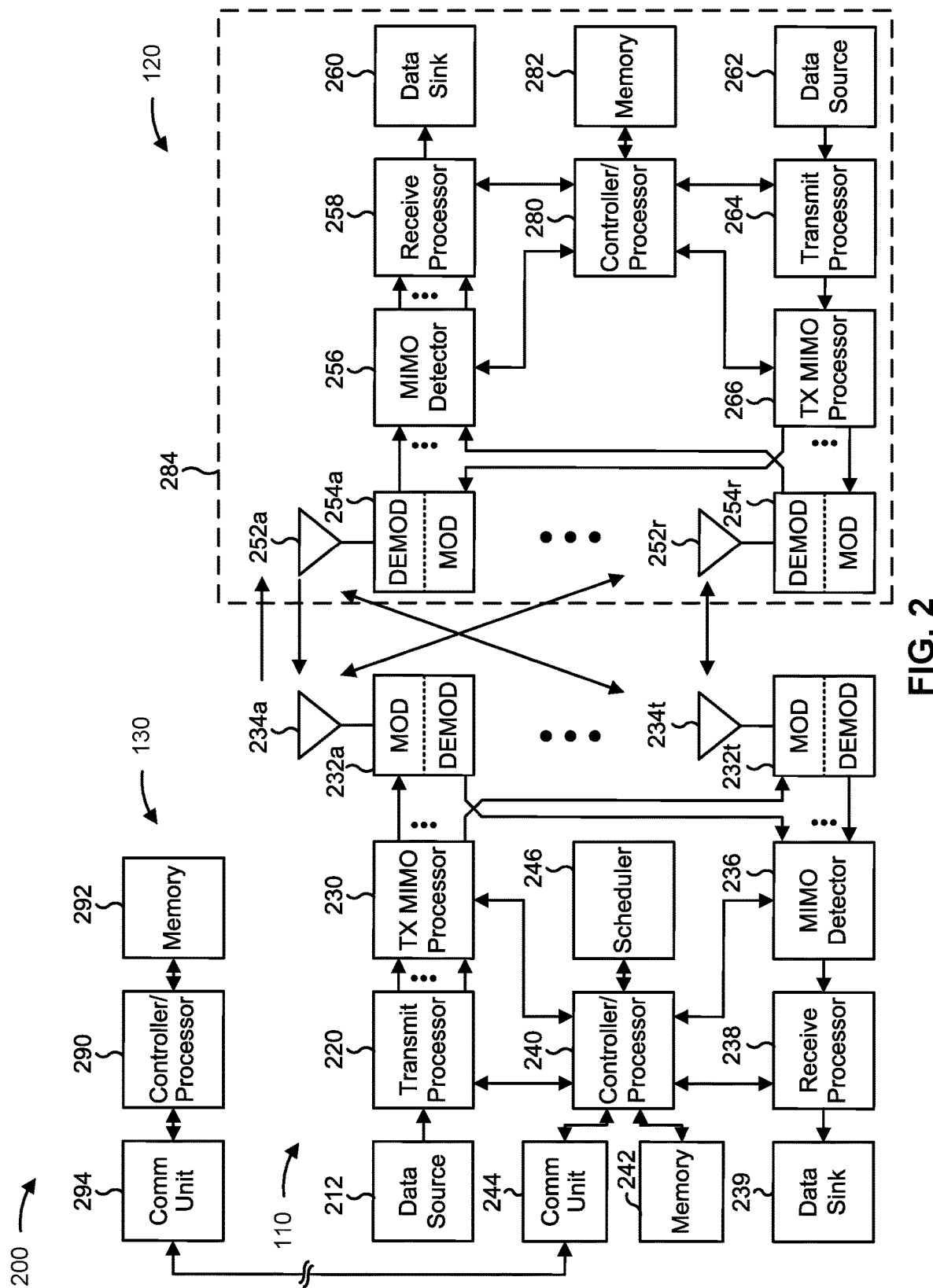
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-15.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-15.

Controller/processor 240 of base station 110, controller/processor 280 of UE 120, and/or any other component(s) of FIG. 2 may perform one or more techniques associated with V2X communications using network coding assisted by a relay, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, interpreting the instructions, and/or the like.

In some aspects, UE 120 may include means for transmitting, to another UE, a set of encoded packets associated with a V2X communication, wherein the set of encoded packets are generated according to a network coding scheme, means for transmitting, to a relay device, the set of encoded packets associated with the V2X communication, means for receiving, from the relay device, an acknowledgment message based at least in part on transmitting, to the relay device, the set of encoded packets associated with the V2X communication, means for receiving, from one or more other UEs, one or more sets of encoded packets associated with one or more V2X communications, means for receiving, from a relay device, a set of encoded packets associated with the one or more V2X communications, means for decoding, according to a network coding scheme, the one or more sets of encoded packets associated with one or more V2X communications and the set of encoded packets associated with the one or more V2X communications to form a set of source packets associated with the one or more V2X communications, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a relay device may include means for receiving, from a first UE, a first V2X communication, means for receiving, from a second UE, a second V2X communication, wherein the first V2X communication and the second V2X communication are intended for a third UE, means for transmitting, to the third UE, a set of encoded packets associated with the first V2X communication and the second V2X communication, wherein the set of encoded packets are generated according to a network coding scheme, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
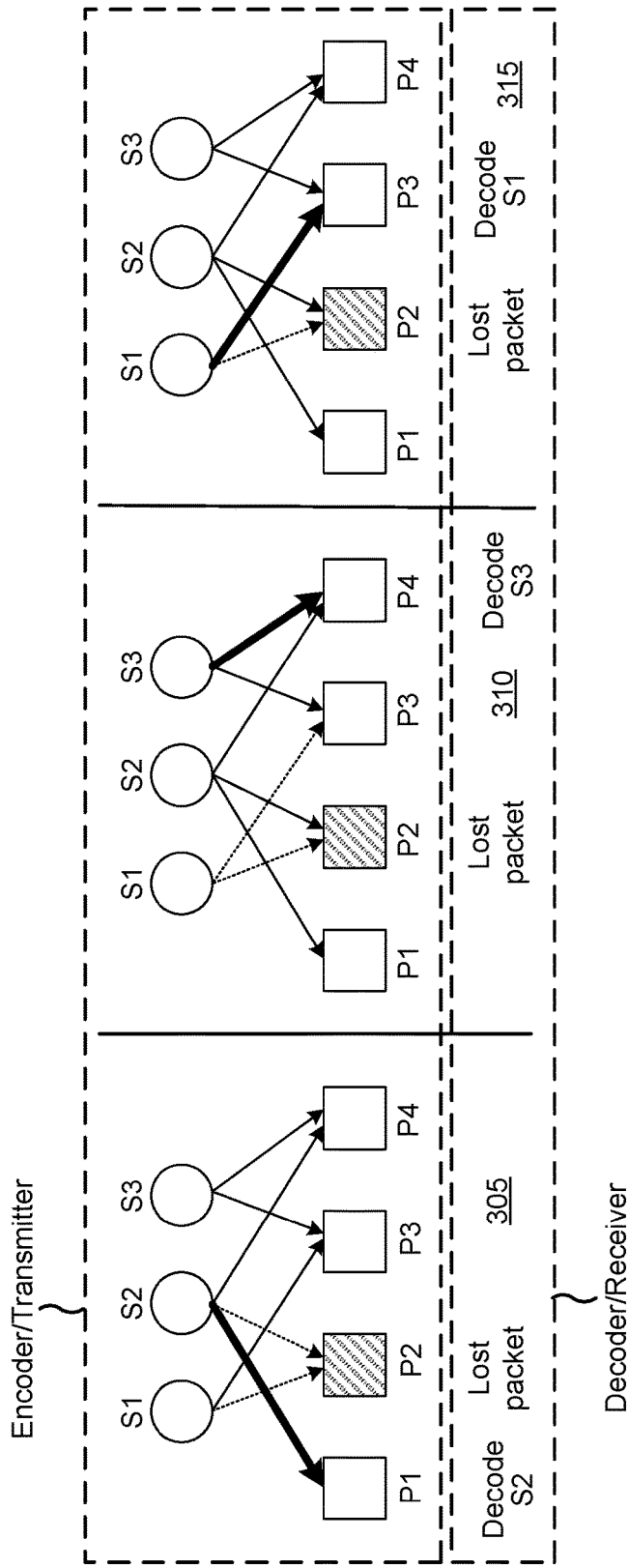
FIG. 3 is a diagram illustrating an example of network coding, in accordance with various aspects of the present disclosure.

FIG. 3 is a diagram illustrating an example 300 of network coding, in accordance with various aspects of the present disclosure. As shown in FIG. 3, an encoder (or transmitter) may communicate with a decoder (or receiver). The encoder is sometimes also referred to as a transmitter, an encoder node, or a transmitter node. The encoder may include a UE 120, a base station 110, an integrated access and backhaul (IAB) device, and/or the like. An IAB device may include an IAB donor (e.g., a central unit (CU) of an IAB donor, a distributed unit (DU) of an IAB donor, and/or the like), an IAB node (e.g., a DU of an IAB node, a mobile termination (MT) of an IAB node, and/or the like), and/or the like. The decoder is sometimes also referred to as a receiver, a decoder node, or a receiver node. The decoder may include a UE 120, a base station 110, an IAB device, and/or the like.

As shown in FIG. 3, an encoder (or transmitter) may encode data, shown as a set of source packets or original packets (p1, p2, and p3), into a set of encoded packets using network coding. An encoded packet may be the same as a source packet, may be a redundancy version of a source packet, may include a combination of multiple source packets (e.g., a subset of the source packets), may include a redundancy version of the combination, and/or the like. The number of encoded packets may be the same as or different than the number of source packets. In some aspects, the number of encoded packets may be unlimited (e.g., the encoder may generate any number of encoded packets), such as when using a rateless network coding scheme. In example 300, the encoder encodes K source packets (where K=3) into N encoded packets (where N=4). The encoder transmits the encoded packets to a decoder (or receiver). The decoder uses network coding to decode the encoded packets and recover the source packets. As used herein, network coding may be performed using any type of network coding scheme, such as fountain coding, linear network coding, random linear network coding, Luby transform (LT) network coding, Raptor network coding, and/or the like.

In example 300, the encoder encodes three source packets ($S_1$, $S_2$, and $S_3$) into four encoded packets: $P_1$ (e.g., that carries $S_2$), $P_2$ (e.g., that carries $S_1+S_2$), $P_3$ (e.g., that carries $S_1+S_3$), and $P_4$ (e.g., that carries $S_2-S_3$). The encoder may transmit the four encoded packets to the decoder. In this example, the packet $P_2$ (carrying $S_1+S_2$) is not successfully received by the decoder. In a first operation 305, the decoder decodes the packet $P_1$ (carrying $S_2$). In a second operation 310, the decoder obtains $S_3$ from the packet $P_4$ (carrying $S_2-S_3$) because the decoder has already decoded $S_2$ and can use combining to obtain $S_3$ from $S_2-S_3$. In a third operation 315, the decoder obtains $S_1$ from the packet $P_3$ (carrying $S_1+S_3$) because the decoder has already decoded $S_3$ and can use combining to obtain $S_1$ from $S_1+S_3$. In some aspects, an encoded packet may include an indication (e.g., in a header of the encoded packet) that indicates the source packet(s) that are included in the encoded packet. Thus, the decoder can obtain $S_1$, $S_2$, and $S_3$ despite $P_2$ failing, and using less overhead than packet data convergence protocol (PDCP) duplication. For example, PDCP duplication may duplicate all of the source packets for a total of six transmissions, while the example network coding shown in FIG. 3 uses four transmissions.

In some cases, the encoder may continue to transmit encoded packets (e.g., the same combination of encoded packets or different combinations of encoded packets) to the decoder until the encoder receives a notification from the decoder. For example, the decoder may successfully receive the source packets or may abort decoding, which may trigger the decoder to send a notification to the encoder. The notification may include, for example, an acknowledgement (ACK), a stop message (STOP), and/or the like. In some cases, the decoder may transmit an ACK for each original packet that is successfully received. Additionally, or alternatively, the decoder may transmit an ACK upon successful reception of all of the source packets. Upon receiving the notification, the encoder may encode additional data (e.g., a new set of source packets, such as $S_4$, $S_5$, and $S_6$), and may transmit encoded packets to the decoder, in a similar manner as described above, until all of the data has been transmitted and/or successfully received. Alternatively, to conserve network resources and reduce overhead, the encoder may not transmit an ACK or a negative acknowledgement (NACK) for received packets.

In some cases, such as when using a Raptor network coding scheme, the encoder may perform inner coding, or precoding, to generate a set of intermediate packets, that include a set of redundant packets, from the source packets. A redundant packet may be a copy of a source packet or a redundancy version of a source packet. In some aspects, a redundant packet may be a low density parity check (LDPC) packet. For example, the encoder may apply inner coding to generate K' intermediate packets (e.g., original plus redundant packets from K source packets). The encoder may then perform outer coding (e.g., fountain coding, LT network coding, and/or the like) to generate N encoded packets from the K' intermediate packets, in a similar manner as described above. As a result, the encoding and/or decoding complexity of the Raptor network coding scheme may be linear. The encoded packets may include a set of systemic packets and a set of repair packets. In some aspects, the decoder may choose to not decode a packet included in the set of systematic symbols that has a high decoding complexity (e.g., is associated with a high encoding degree, is associated with a high quantity of source packets, and/or the like). The decoder may recover the source packets associated with the packet that is not decoded from one or more packets included in the set of repair packets. The one or more packets included in the set of repair packets may be associated with a lower decoding complexity. As a result, the decoding complexity may be reduced.

Figure 4:
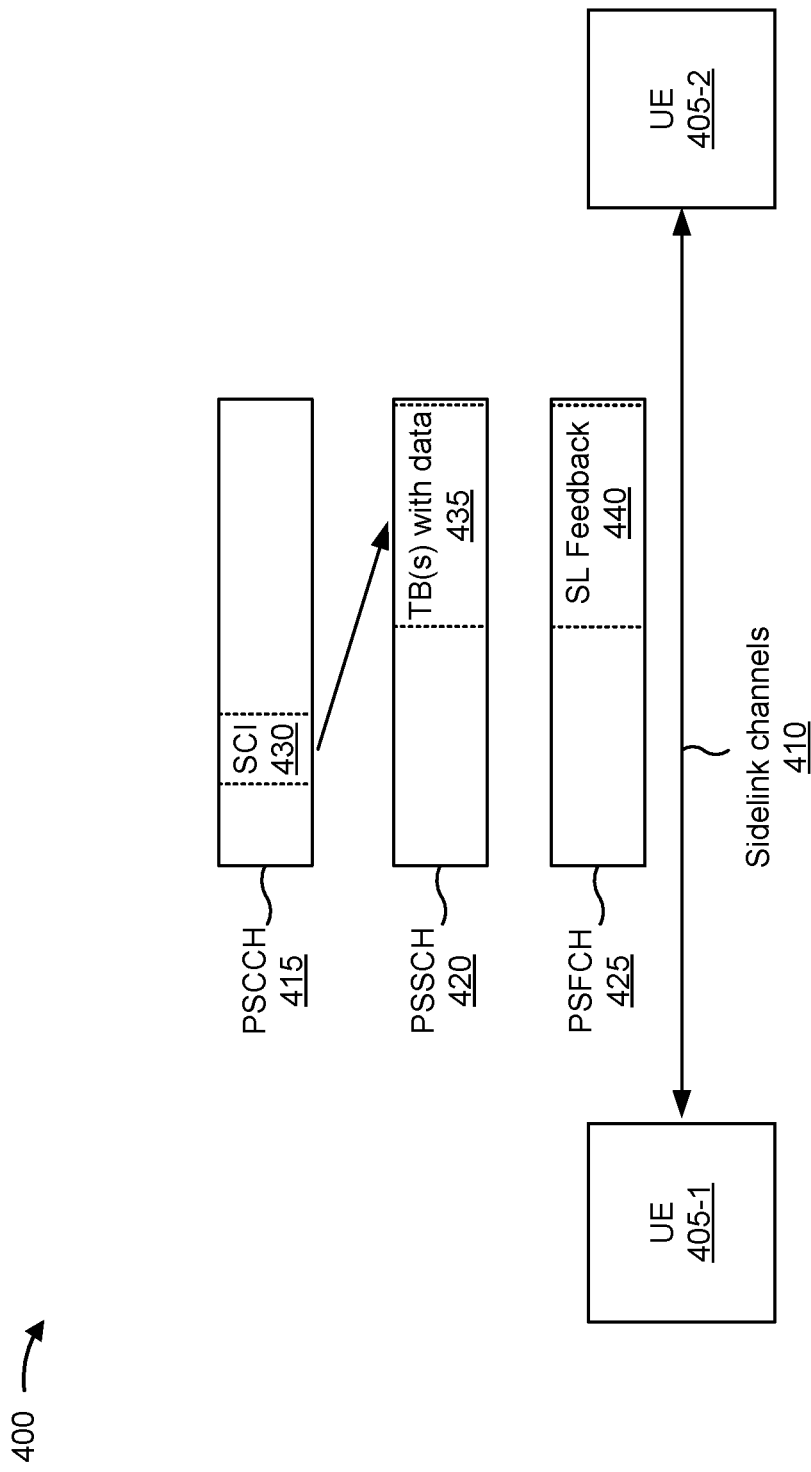
FIG. 4 is a diagram illustrating an example of sidelink communications, in accordance with various aspects of the present disclosure.

FIG. 4 is a diagram illustrating an example 400 of sidelink communications, in accordance with various aspects of the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, V2P communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
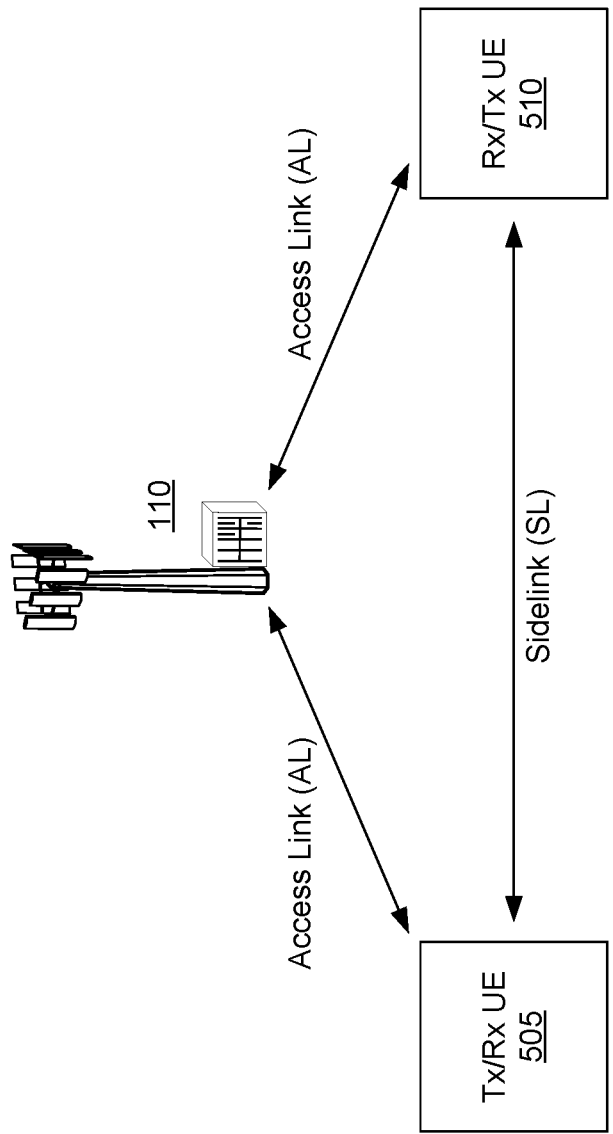
FIG. 5 is a diagram illustrating an example of sidelink communications and access link communications, in accordance with various aspects of the present disclosure.

FIG. 5 is a diagram illustrating an example 500 of sidelink communications and access link communications, in accordance with various aspects of the present disclosure.

As shown in FIG. 5, a transmitter (Tx) UE 505 and a receiver (Rx) UE 510 may communicate with one another via a sidelink, as described above in connection with FIG. 4. As further shown, in some sidelink modes, a base station 110 may communicate with the Tx UE 505 via a first access link. Additionally, or alternatively, in some sidelink modes, the base station 110 may communicate with the Rx UE 510 via a second access link. The Tx UE 505 and/or the Rx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
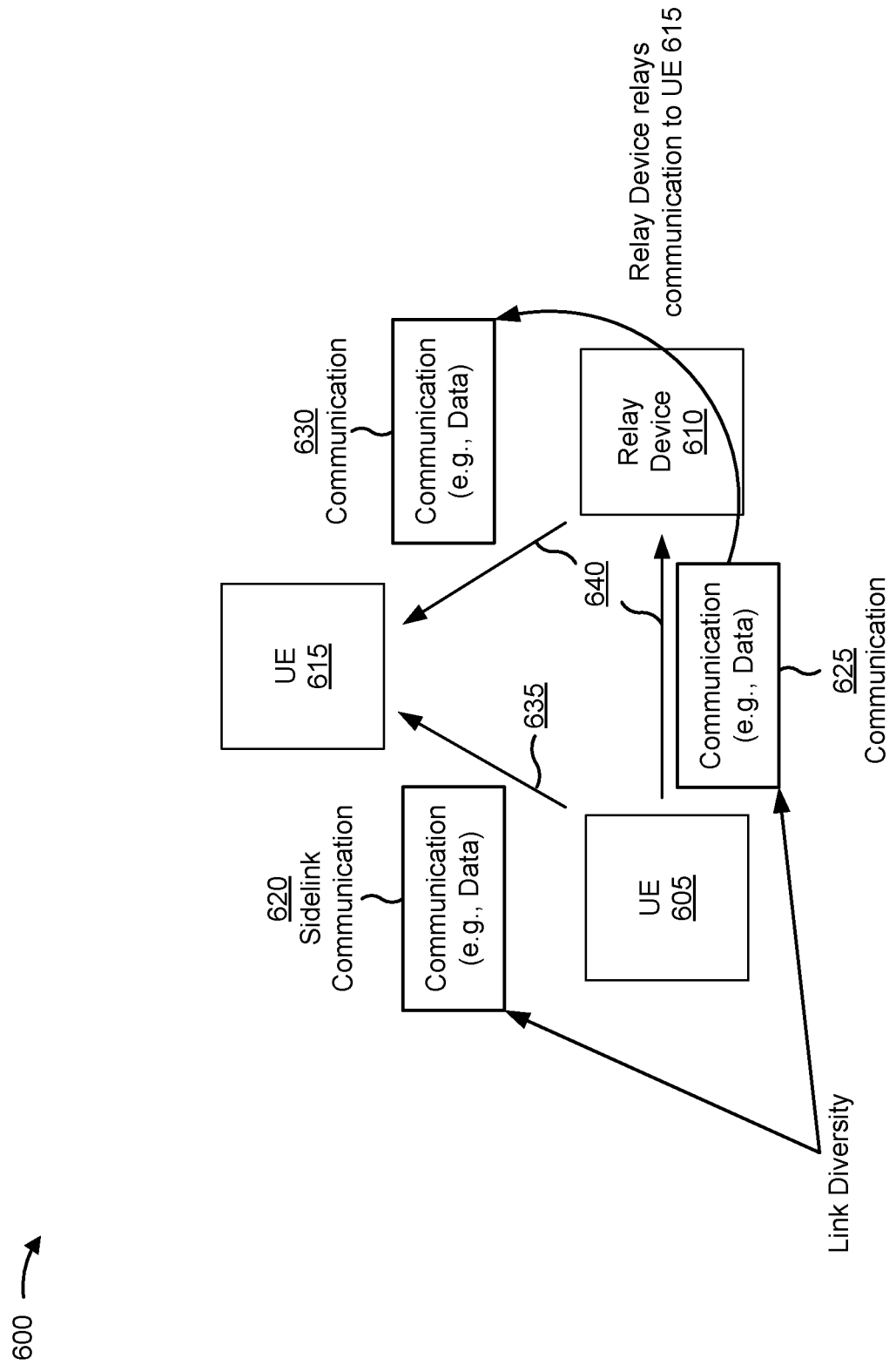
FIG. 6 is a diagram illustrating an example of a relay device that relays communications between a first UE and a second UE, in accordance with various aspects of the present disclosure.

FIG. 6 is a diagram illustrating an example 600 of a relay device that relays communications between a first UE and a second UE, in accordance with various aspects of the present disclosure. As shown, example 600 includes a UE 605, a relay device 610, and a UE 615. In example 600, the UE 605 is a Tx UE, and the relay device 610 is an Rx device. In some aspects, the relay device 610 is a base station 110. In some aspects, the UE 605 is one UE 120, and the relay device 610 is another UE 120. In some aspects, the UE 605 may be referred to as a remote UE.

As shown in FIG. 6, the UE 605 may transmit a communication (e.g., data, control information, and/or the like) directly to the UE 615 as a sidelink communication 620. Additionally, or alternatively, the UE 605 may transmit a communication (e.g., data, control information, and/or the like) indirectly to the UE 615 via the relay device 610. For example, the UE 605 may transmit the communication to the relay device 610 as a communication 625, and the relay device 610 may relay (e.g., forward, transmit, and/or the like) the communication to the UE 615 as a communication 630.

In some aspects, the UE 605 may communicate directly with the UE 615 via a sidelink 635. For example, the sidelink communication 620 may be transmitted via the sidelink 635. A communication transmitted via the sidelink 635 between the UE 605 and the UE 615 (e.g., in the sidelink communication 620) does not pass through and is not relayed by the relay device 610. In some aspects, the UE 605 may communicate indirectly with the UE 615 via an indirect link 640. For example, the communication 625 and the communication 630 may be transmitted via different segments of the indirect link 640. A communication transmitted via the indirect link 640 between the UE 605 and the UE 615 (e.g., in the communication 625 and the communication 630) passes through and is relayed by the relay device 610.

Using the communication scheme shown in FIG. 6 may improve network performance and increase reliability by providing the UE 605 with link diversity for communicating with the UE 615. For millimeter wave (e.g., frequency range 2, or FR2) communications, which are susceptible to link blockage and link impairment, this link diversity improves reliability and prevents multiple retransmissions of data that may otherwise be retransmitted in order to achieve a successful communication. Similarly, for V2X communications, which may be associated with a limited spectrum for communications, this link diversity improves reliability and prevents multiple retransmissions of data that may otherwise be retransmitted in order to achieve a successful communication. However, techniques described herein are not limited to millimeter wave communications, and may be used for sub-6 gigahertz (e.g., frequency range 1, or FR1) communications.

In some cases, the UE 605 may transmit a communication (e.g., the same communication) to the UE 615 via both the sidelink 635 and the indirect link 640. In other cases, the UE 605 may select one of the links (e.g., either the sidelink 635 or the indirect link 640), and may transmit a communication to the UE 615 using only the selected link. Alternatively, the UE 605 may receive an indication of one of the links (e.g., either the sidelink 635 or the indirect link 640), and may transmit a communication to the UE 615 using only the indicated link. The indication may be transmitted by the UE 615 and/or the relay device 610. In some aspects, such selection and/or indication may be based at least in part on channel conditions, link reliability, and/or the like.

As indicated above, FIG. 6 is provided as an example. Other examples may differ from what is described with respect to FIG. 6.

Figure 7:
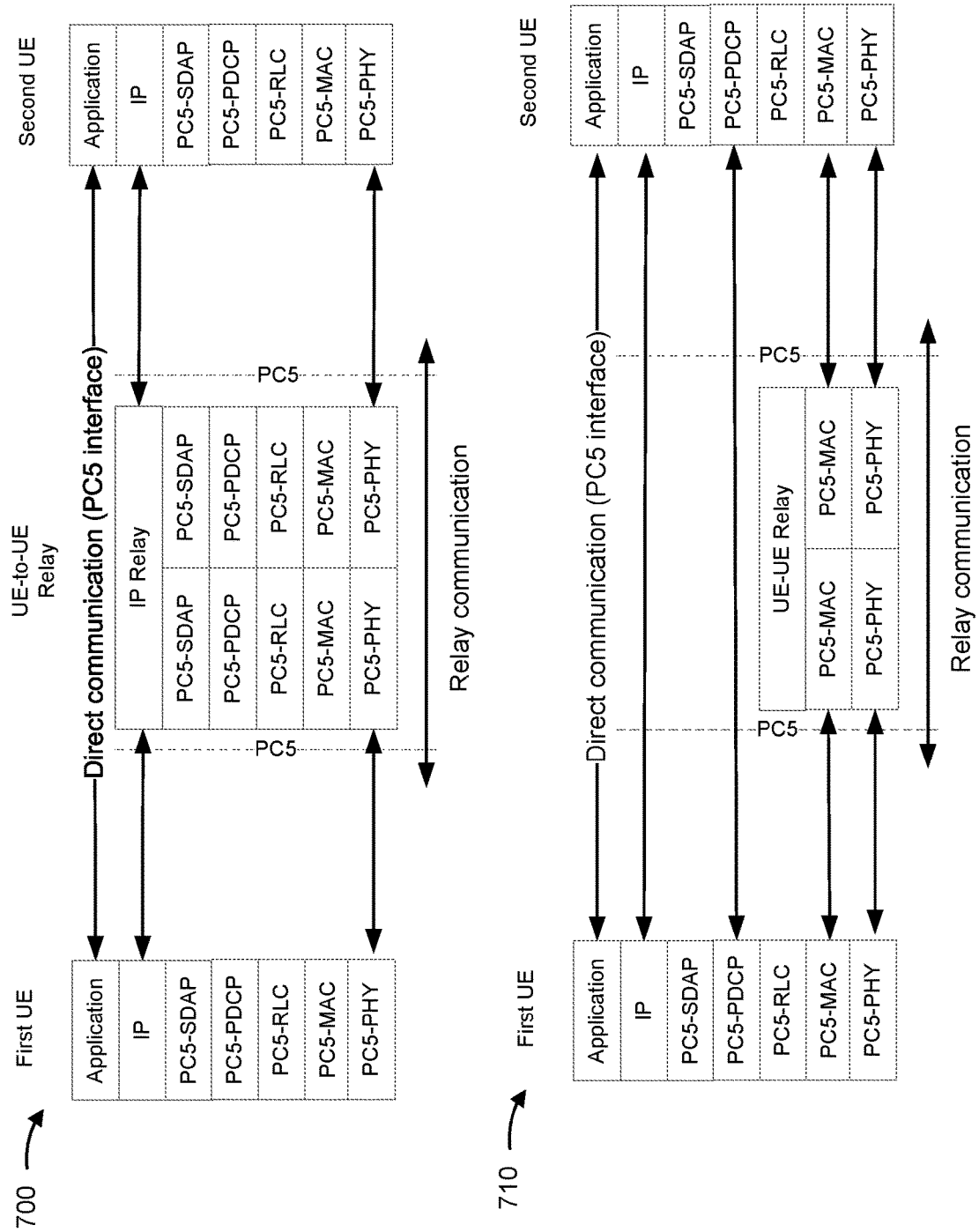
FIG. 7 is a diagram illustrating examples of protocol stacks for relaying communications between a first UE and a second UE via a relay device.

FIG. 7 is a diagram illustrating examples 700 and 710 of protocol stacks for relaying communications between a first UE and a second UE via a relay device. The relay device may use layer 3 relaying (e.g., as shown in example 700) or layer 2 relaying (e.g., as shown in example 710), in accordance with various aspects of the present disclosure.

As shown in FIG. 7 and example 700, an NR protocol stack implemented on a first UE (e.g., a remote UE, a Tx UE, and/or the like) and on a second UE includes an application layer, an internet protocol (IP) layer, and/or the like. As further shown in FIG. 7 and example 700, the layers of the NR protocol stacks of the first UE and the second UE may correspond to each other. The IP layer may be layer 3 in the NR protocol stack and may include multiple sub-layers for communication via a PC5 interface (or another sidelink interface) with another UE. For example, the NR protocol stack may include a PC5 service data adaptation protocol (SDAP) sub-layer, a PC5 a packet data convergence protocol (PDCP) sub-layer, a radio link control (RLC) sub-layer, a medium access control (MAC) sub-layer, a physical (PHY) sub-layer, and/or the like.

When communicating directly with another UE (e.g., via a PC5 interface), a UE (e.g., a remote UE) may communicate at an application layer. However, in a relay scenario, the UE may communicate via a PC5 interface (or another sidelink interface) or a Uu interface (or another direct interface) with a relay device (e.g., a relay UE, a relay base station, and/or the like). For example, the first UE may communicate via the IP layer (e.g., and the PC5-SDAP sub-layer, the PC5-PDCP sub-layer, the PC5-RLC sub-layer, the PC5-MAC sub-layer, and the PC5-PHY sub-layer) to communicate with a corresponding IP layer (e.g., corresponding PC5-SDAP sub-layer, PC5-PDCP sub-layer, PC5-RLC sub-layer, PC5-MAC sub-layer, and PC5-PHY sub-layer) of the relay device. The relay device may also include an IP layer (e.g., PC5-SDAP sub-layer, PC5-PDCP sub-layer, PC5-RLC sub-layer, PC5-MAC sub-layer, and PC5-PHY sub-layer) to communicate via a PC5 interface (or a Uu interface if the relay device is a base station) with corresponding sub-layers of the second UE. Based at least in part on passing information between PC5 sub-layers, the relay device enables layer 3 relaying between the first UE and the second UE.

As shown in FIG. 7 and by example 710, an NR protocol stack implemented on a first UE (e.g., a remote UE, a Tx UE, and/or the like) and on a second UE includes an application layer, an IP layer, and/or the like (e.g., as described above with respect to example 700). When communicating directly with another UE (e.g., via a PC5 interface), a UE (e.g., a remote UE) may communicate at an application layer, an IP layer, a PC5-PDCP sub-layer, and/or the like. However, in a relay scenario, the UE may communicate via a PC5 interface (or another sidelink interface), a Uu interface (or another direct interface) with a relay device (e.g., a relay UE, a relay base station, and/or the like). For example, the first UE may communicate via the PC5-MAC sub-layer and the PC5-PHY sub-layer to communicate with corresponding layers of the relay device. The relay device may include a corresponding PC5-MAC sub-layer and a corresponding PC5-PHY sub-layer to communicate via a PC5 interface (or a Uu interface if the relay device is a base station) with corresponding sub-layers of the second UE. Based at least in part on passing information between PC5 sub-layers, the relay device enables layer 2 relaying between the first UE and the second UE.

As indicated above, FIG. 7 is provided as an example. Other examples may differ from what is described with respect to FIG. 7.

In some wireless networks, such as in vehicle-to-everything (V2X) wireless environment, some applications may require a high level of reliability for communications between a first UE and a second UE. For example, in an enhanced V2X (eV2X) wireless environment, some applications require ultra-high reliability. An extended sensor sharing application may require communication reliability ranging from 90% to 99.999%. A cooperative driving application for platoon groups may require communication reliability up to 99.99%. To achieve these levels of ultra-high communication reliability, retransmissions of communications will be required in most (or all) cases. For example, due to channel interference or link conditions, a receiving UE may not receive a communication from a transmitting UE. As a result, to achieve the ultra-high communication reliability required by some V2X applications, the transmitting UE will need to retransmit the communication one or more times until the receiving UE successfully receives the communication. In some cases, a UE may need to perform a high quantity of retransmissions in order to meet the high level of communication reliability required by some V2X applications. However, the high quantity of retransmissions may require a high signaling overhead and may consume resources associated with communicating the retransmissions. Additionally, a communication spectrum for V2X communications may be limited. As a result, the high quantity of retransmissions from one or more UEs in the V2X network may cause additional interference within the V2X spectrum. As a result, the retransmissions may actually degrade network performance and communication reliability (e.g., due to the increased interference in the V2X spectrum).

Some techniques and apparatuses described herein enable V2X communications using network coding assisted by a relay. For example, a first UE may transmit (e.g., broadcast) a V2X communication to a second UE and a relay device using network coding. The relay device may receive and successfully decode the V2X communication intended for the second UE. In some aspects, the relay device may receive and successfully decode a second V2X communication intended for the second UE (e.g., from the first UE or from another UE). The relay device may relay the first V2X and/or the second V2X communication to the second UE using network coding. As a result, a quantity of retransmissions associated with a particular V2X communication is reduced by using network coding and by transmitting the V2X communication to a relay. Additionally, using network coding may reduce feedback channel use, thereby reducing signaling overhead and reducing interference within the V2X spectrum. Moreover, the relay device may relay one or more V2X communications (e.g., from one or more remote UEs) to a UE. This reduces the quantity or retransmissions and interference associated with the V2X communication(s). Further, as the link between the relay device and the UE may be better than a sidelink between the UE and the one or more remote UEs, network performance and communication reliability of the V2X communication(s) is improved.

Figure 8:
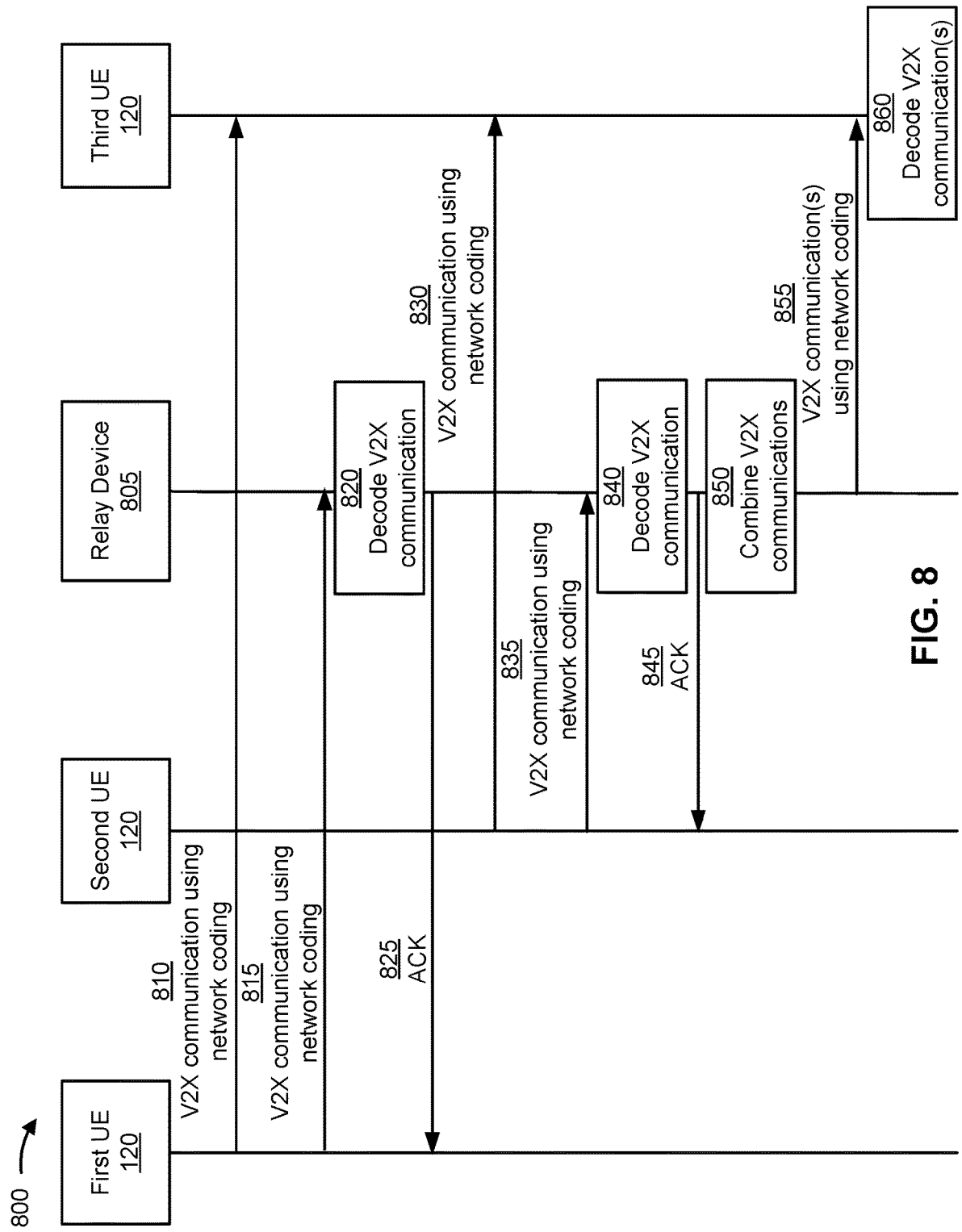
FIGS. 8-10 are diagrams illustrating examples associated with vehicle-to-everything (V2X) communications using network coding assisted by a relay, in accordance with various aspects of the present disclosure.

FIG. 8 is a diagram illustrating an example 800 associated with V2X communications using network coding assisted by a relay, in accordance with various aspects of the present disclosure. As shown in FIG. 8, a first UE 120, a second UE 120, a third UE 120, and a relay device 805 may communicate with one another. In some aspects, the first UE 120, the second UE 120, and the third UE 120 may be associated with corresponding vehicles in a V2X environment (e.g., the first UE 120 may be associated with a first vehicle, the second UE 120 may be associated with a second vehicle, and the third UE 120 may be associated with a third vehicle). The relay device 805 may be a UE-to-UE relay device (e.g., the relay device 805 may relay a communication from one UE to another UE). In some aspects, the relay device 805 may be a base station 110. In some aspects, the relay device 805 may be a UE 120. The relay device may be a Layer 2 relay device or a Layer 3 relay device.

As shown by reference number 810, the first UE 120 may transmit a first V2X communication to the third UE 120 using network coding. As shown by reference number 815, the first UE 120 may transmit the first V2X communication to the relay device 805 using network coding. For example, the first UE 120 may broadcast the first V2X communication using network coding to both the third UE 120 and the relay device 805. The first UE 120 may segment a plurality of bits of the first V2X communication to form a set of source packets associated with the first V2X communication. Each packet included in the set of source packets may be a same size (e.g., may include a same quantity of bits). The first UE 120 may encode the set of source packets to form a set of encoded packets, according to a network coding scheme, associated with the first V2X communication. The first UE 120 may transmit (e.g., broadcast) the set of encoded packets associated with the first V2X communication to the third UE 120 and the relay device 805.

In some aspects, the network coding scheme may be a rateless network coding scheme (e.g., the first UE 120 may generate an unlimited number of encoded packets from the set of source packets associated with the first V2X communication). In some aspects, the network coding scheme may be a fountain network coding scheme, a Luby transform network coding scheme, a Raptor network coding scheme, and/or the like.

As shown by reference number 820, the relay device may receive and decode the first V2X communication from the first UE 120. For example, the relay device 805 may decode (e.g., according to the network coding scheme used by the first UE 120) a set of encoded packets received from the first UE 120 to form or determine the set of source packets associated with the first V2X communication.

As shown by reference number 825, upon successfully decoding the set of encoded packets associated with the first V2X communication, the relay device 805 may transmit an acknowledgment (ACK) message to the first UE 120 indicating that the first V2X communication was successfully received and successfully decoded by the relay device 805. The first UE 120 may stop broadcasting the first V2X communication upon receiving the ACK message from the relay device 805. For example, the first UE 120 may stop transmitting the first V2X communication to the third UE 120 based at least in part on receiving the ACK message from the relay device 805. Similarly, the first UE 120 may stop transmitting the first V2X communication to the relay device 805 based at least in part on receiving the ACK message from the relay device 805. In other words, the first UE 120 may continue to transmit (e.g., broadcast) the first V2X communication until the first UE 120 receives an ACK message from the relay device 805.

As shown by reference number 830, the second UE 120 may transmit a second V2X communication to the third UE 120 using network coding. As shown by reference number 835, the second UE 120 may transmit the second V2X communication to the relay device 805 using network coding. For example, the second UE 120 may broadcast the second V2X communication using network coding to both the third UE 120 and the relay device 805. The second UE 120 may segment a plurality of bits of the second V2X communication to form a set of source packets associated with the second V2X communication. Each packet included in the set of source packets may be a same size (e.g., may include a same quantity of bits). The size of the source packets associated with the second V2X communication may be the same size as the source packets associated with the first V2X communication. In some aspects, the size of the source packets associated with the second V2X communication may be a different size than the source packets associated with the first V2X communication. The second UE 120 may encode the set of source packets to form a set of encoded packets, according to a network coding scheme, associated with the second V2X communication. The second UE 120 may transmit (e.g., broadcast) the set of encoded packets associated with the second V2X communication to the third UE 120 and the relay device 805.

In some aspects, the network coding scheme may be a rateless network coding scheme (e.g., the second UE 120 may generate an unlimited number of encoded packets from the set of source packets associated with the first V2X communication). In some aspects, the network coding scheme may be a fountain network coding scheme, a Luby transform network coding scheme, a Raptor network coding scheme, and/or the like.

As shown by reference number 840, the relay device may receive and decode the second V2X communication from the second UE 120. For example, the relay device 805 may decode (e.g., according to the network coding scheme used by the second UE 120) a set of encoded packets received from the second UE 120 to form or determine the set of source packets associated with the second V2X communication.

As shown by reference number 845, upon successfully decoding the set of encoded packets associated with the second V2X communication, the relay device 805 may transmit an ACK message to the second UE 120 indicating that the second V2X communication was successfully received and successfully decoded by the relay device 805. The second UE 120 may stop broadcasting the second V2X communication upon receiving the ACK message from the relay device 805. For example, the second UE 120 may stop transmitting the second V2X communication to the third UE 120 based at least in part on receiving the ACK message from the relay device 805. Similarly, the second UE 120 may stop transmitting the second V2X communication to the relay device 805 based at least in part on receiving the ACK message from the relay device 805. In other words, the second UE 120 may continue to transmit (e.g., broadcast) the second V2X communication until the second UE 120 receives an ACK message from the relay device 805.

As shown by reference number 850, the relay device 805 may combine the first V2X communication and the second V2X communication. For example, after successfully receiving and/or successfully decoding the first V2X communication and the second V2X communication, the relay device 805 may determine a set of source packets associated with the first V2X communication and a set of source packets associated with the second V2X communication. As described above, both the first V2X communication and the second V2X communication may be intended for the third UE 120. The relay device 805 may combine the first V2X communication and the second V2X communication to reduce a quantity of transmissions and/or retransmissions in the V2X environment. As a result, network performance is improved due to a reduction in signaling overhead associated with a V2X communication and a reduction in interference present in the V2X environment.

In some aspects, the relay device 805 may concatenate the first V2X communication and the second V2X communication to form a combined set of source packets associated with the first V2X communication and the second V2X communication. For example, the relay device 805 may concatenate the set of source packets associated with the first V2X communication and the set of source packets associated with the second V2X communication to form the combined set of source packets. In some aspects, the relay device 805 may not combine the set of source packets associated with the first V2X communication and the set of source packets associated with the second V2X communication.

In some aspects, the relay device 805 may combine the first V2X communication and the second V2X communication using an exclusive or (XOR) operation to form a combined V2X communication. For example, the relay device 805 may combine the set of source packets associated with the first V2X communication and the set of source packets associated with the second V2X communication using an XOR operation to form a combined set of source packets.

As shown by reference number 855, the relay device 855 may transmit one or more V2X communications using network coding to the third UE 120. For example, if the relay device 805 combines the first V2X communication and the second V2X communication by concatenating the set of source packets associated with the first V2X communication and the set of source packets associated with the second V2X communication to form the combined set of source packets, the relay device may encode the combined set of source packets according to a network coding scheme (e.g., a rateless network coding scheme) to form a set of encoded packets. The relay device 805 may transmit the set of encoded packets to the third UE 120. The network coding scheme may be the same network coding scheme used by the first UE 120 and/or the second UE 120. In some aspects, the network coding scheme used by the relay device 805 may be different than the network coding scheme used by the first UE 120 and/or the second UE 120.

If the relay device 805 does not combine the set of source packets associated with the first V2X communication and the set of source packets associated with the second V2X communication, the relay device 805 may encode the set of source packets associated with the first V2X communication to form a set of encoded packets associated with the first V2X communication. The relay device 805 may encode the set of source packets associated with the second V2X communication to form a set of encoded packets associated with the second V2X communication. The relay device 805 may transmit the set of encoded packets associated with the first V2X communication to the third UE 120 until the relay device 805 receives an ACK message from the third UE 120 (e.g., indicating that the first V2X communication sent by the relay device 805 was successfully received and/or successfully decoded by the third UE 120). The relay device 805 may transmit the set of encoded packets associated with the second V2X communication to the third UE 120 until the relay device 805 receives an ACK message from the third UE 120 (e.g., indicating that the second V2X communication sent by the relay device 805 was successfully received and/or successfully decoded by the third UE 120).

If the relay device 805 combines the first V2X communication and the second V2X communication by performing an XOR operation, the relay device 805 may encode the set of source packets generated by performing the XOR operation according to a network coding scheme (e.g., a rateless network coding scheme) to form a set of encoded packets associated with the combined V2X communication. The relay device 805 may transmit the set of encoded packets associated with the combined V2X communication to the third UE 120.

As shown by reference number 860, the third UE 120 may decode V2X communications received from the first UE 120, from the second UE 120, and/or from the relay device 805. For example, if the relay device 805 combines the first V2X communication and the second V2X communication by concatenating a set of source packets associated with the first V2X communication and a set of source packets associated with the second V2X communication, the third UE 120 may decode a set of encoded packets received from the first UE 120, a set of encoded packets received from the second UE 120, and a set of encoded packets received from the relay device 805. The set of encoded packets received from the first UE 120 may be associated with the first V2X communication. The set of encoded packets received from the second UE 120 may be associated with the second V2X communication. The set of encoded packets received from the relay device 805 may be associated with both the first V2X communication and the second V2X communication. The third UE 120 may determine a first set of source packets (e.g., from decoding the encoded packets received from the first UE 120), a second set of source packets (e.g., from decoding the encoded packets received from the second UE 120), and a third set of source packets (e.g., from decoding the encoded packets received from the relay device 805).

In some aspects, the third UE 120 may not successfully receive enough encoded packets from the first UE 120 or the second UE 120 to determine all source packets associated with the first V2X communication and the second V2X communication, respectively (e.g., if the link quality between the first UE 120 and third UE 120 and/or the link quality between the second UE 120 and third UE 120 is poor). For example, the first set of source packets may be a partial set of source packets in that all source packets associated with the first V2X communication could not be determined from the set of encoded packets transmitted by the first UE 120. As a result, the third UE 120 may determine information included in the first V2X communication from at least one of the first set of source packets (e.g., from decoding the encoded packets received from the first UE 120) or the third set of source packets (e.g., from decoding the encoded packets received from the relay device 805). Similarly, the third UE 120 may determine information included in the second V2X communication from at least one of the second set of source packets (e.g., from decoding the encoded packets received from the second UE 120) or the third set of source packets (e.g., from decoding the encoded packets received from the relay device 805). In some aspects, the third UE 120 may determine the first set of source packets and/or the second set of source packets before receiving the set of encoded packets from the relay device 805.

If the relay device 805 does not combine the first V2X communication and the second V2X communication, the third UE 120 may decode a set of encoded packets received from the first UE 120 associated with the first V2X communication, a set of encoded packets received from the relay device 805 associated with the first V2X communication, a set of encoded packets received from the second UE 120 associated with the second V2X communication, and a set of encoded packets received from the relay device 805 associated with the second V2X communication. The third UE 120 may determine a first set of source packets (e.g., from decoding the encoded packets received from the first UE 120), a second set of source packets (e.g., from decoding the encoded packets received from the relay device 805 that are associated with the first V2X communication), a third set of source packets (e.g., from decoding the encoded packets received from the second UE 120), and a fourth set of source packets (e.g., from decoding the encoded packets received from the relay device 805 that are associated with the second V2X communication).

The third UE 120 may determine information included in the first V2X communication from at least one of the first set of source packets (e.g., from decoding the encoded packets received from the first UE 120) or the second set of source packets (e.g., from decoding the encoded packets received from the relay device 805 that are associated with the first V2X communication). Similarly, the third UE 120 may determine information included in the second V2X communication from at least one of the third set of source packets (e.g., from decoding the encoded packets received from the second UE 120), or the fourth set of source packets (e.g., from decoding the encoded packets received from the relay device 805 that are associated with the second V2X communication). In some aspects, the third UE 120 may determine the first set of source packets and determine the second set of source packets before determining the third set of source packets and determining the fourth set of source packets (e.g., if the first V2X communication is transmitted by the first UE 120 before the second V2X communication is transmitted by the second UE 120). This may reduce latency associated with determining information associated with the first V2X communication. In some aspects, the third UE 120 may determine first set of source packets and determine the third set of source packets before determining the second set of source packets and the fourth set of source packets.

If the relay device 805 combines the first V2X communication and the second V2X communication using an XOR operation, the third UE 120 may decode a set of encoded packets received from the first UE 120 associated with the first V2X communication, a set of encoded packets received from the second UE 120 associated with the second V2X communication, and a set of encoded packets received from the relay device associated with the combined V2X communication. The third UE 120 may determine a first set of source packets (e.g., from decoding the encoded packets received from the first UE 120), a second set of source packets (e.g., from decoding the encoded packets received from the second UE 120), and a third set of source packets (e.g., from decoding the encoded packets received from the relay device 805).

As described above, the first set of source packets and/or the second set of source packets may be partial sets of source packets. For example, the first set of source packets may include one or more source packets associated with the first V2X communication that could not be successfully determined by the third UE 120. Similarly, the second set of source packets may include one or more source packets associated with the second V2X communication that could not be successfully determined by the third UE 120. The third UE 120 may recover the one or more source packets associated with the first V2X communication that could not be successfully determined by the third UE 120 using the second set of source packets and the third set of source packets. For example, the third UE 120 may identify a source packet associated with the first V2X communication that could not be determined. The third UE 120 may use an associated source packet included in the second set of source packets (from decoding the encoded packets received from the second UE 120) and an associated source packet included in the third set of source packets (e.g., from decoding the encoded packets received from the relay device 805) to determine the source packet associated with the first V2X communication that could not be determined from the set of encoded packets received from the first UE 120. The third UE 120 may determine source packet associated with the second V2X communication that could not be determined from the set of encoded packets received from the second UE 120 in a similar manner (e.g., using an associated source packet in the first set of source packets and an associated source packet in the third set of source packets).

As a result, a quantity of retransmissions associated with a particular V2X communication is reduced by using network coding and by transmitting the V2X communication to the relay device 805. Additionally, using network coding reduces feedback channel use, thereby reducing signaling overhead and reducing interference within the V2X spectrum. Moreover, the relay device 805 may relay one or more V2X communications (e.g., from one or more remote UEs, such as the first UE 120 and/or the second UE 120) to a UE (e.g., the third UE 120). This reduces the quantity or retransmissions and interference associated with the V2X communication(s). Further, as the link between the relay device 805 and the third UE 120 may be better than a sidelink between the third UE 120 and the one or more remote UEs (e.g., the first UE 120 and/or the second UE 120), network performance and communication reliability of the V2X communication(s) is improved.

As indicated above, FIG. 8 is provided as an example. Other examples may differ from what is described with respect to FIG. 8.

Figure 9:
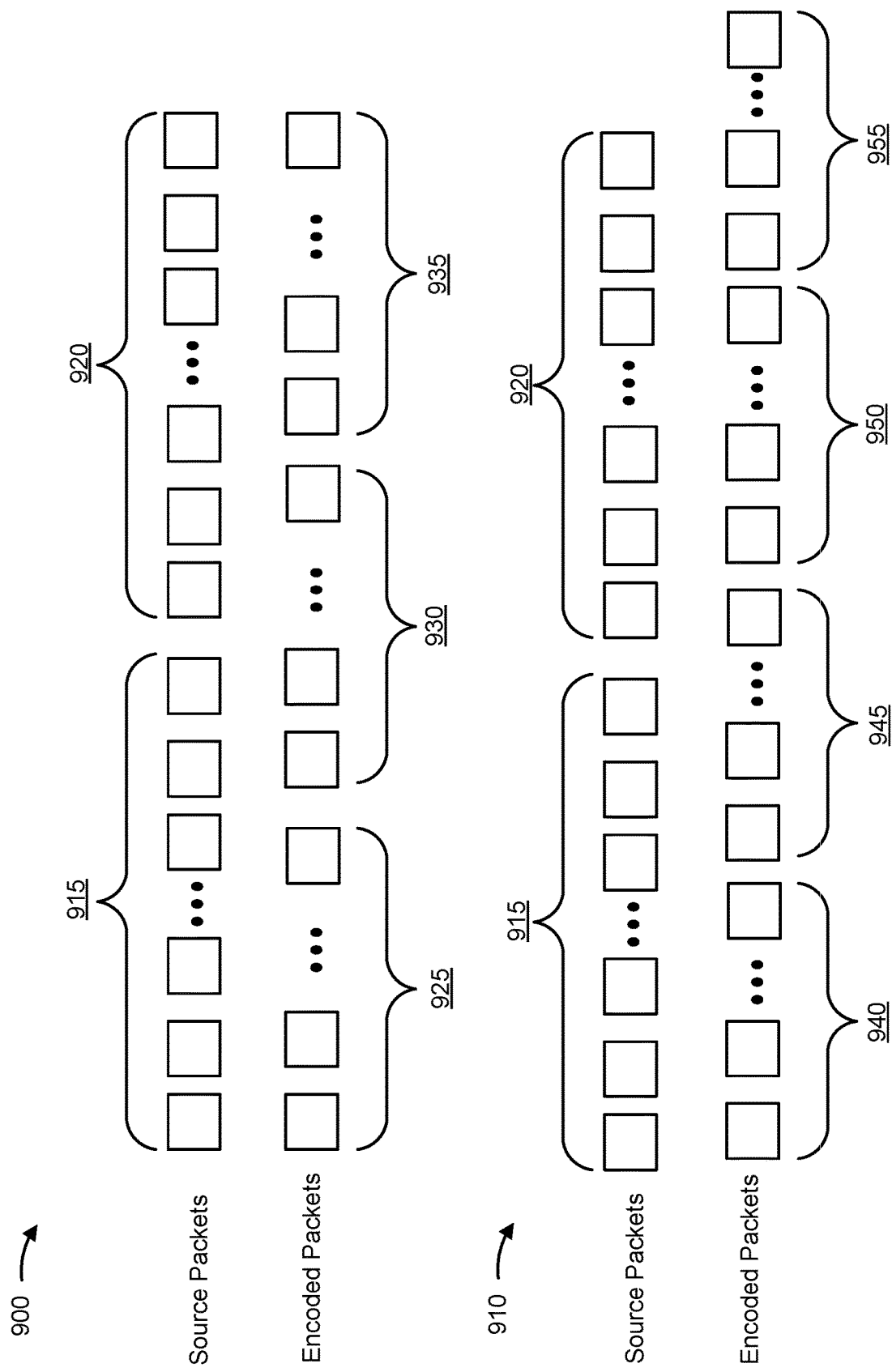

FIG. 9 is a diagram illustrating examples 900 and 910 associated with V2X communications using network coding assisted by a relay, in accordance with various aspects of the present disclosure. As shown in FIG. 9, a UE 120, such as the third UE 120 described above with respect to FIG. 8, may receive encoded packets that were formed from source packets associated with a first V2X communication and a second V2X communication.

As shown in example 900 and by reference number 915, information (e.g., data) included in a first V2X communication may be segmented into a set of source packets. Similarly, as shown by reference number 920, information (e.g., data) included in a second V2X communication may be segmented into a set of source packets. The source packets may be encoded according to a network coding scheme by one or more UEs 120 (e.g., the first UE 120 and the second UE 120 described above with respect to FIG. 8) and/or a relay device (e.g., the relay device 805 described above with respect to FIG. 8). In some aspects, the relay device may concatenate the source packets shown by reference number 915 and the source packets shown by reference number 920 before encoding the source packets to form encoded packets. As shown by reference number 925, a UE 120 (e.g., the third UE 120 described above with respect to FIG. 8) may receive a first set of encoded packets from another UE 120 (e.g., the first UE 120 described above with respect to FIG. 8) that are associated with the first V2X communication and the source packets shown by reference number 915. As shown by reference number the UE 120 (e.g., the third UE 120 described above with respect to FIG. 8) may receive a second set of encoded packets from another UE 120 (e.g., the second UE 120 described above with respect to FIG. 8) that are associated with the second V2X communication and the source packets shown by reference number 920. As shown by reference number 935, the UE 120 (e.g., the third UE 120 described above with respect to FIG. 8) may receive a third set of encoded packets from a relay device (e.g., the relay device 805 described above with respect to FIG. 8) that are associated with the first V2X communication and the second V2X communication (e.g., are formed from encoding the concatenated source packets shown by reference number 915 and 920).

The UE 120 (e.g., the third UE 120 described above with respect to FIG. 8) may determine the source packets shown by reference number 915 by decoding the encoded packets shown by reference number 925 and 935. The UE 120 (e.g., the third UE 120 described above with respect to FIG. 8) may determine the source packets shown by reference number 920 by decoding the encoded packets shown by reference number 930 and 935. That is, any source packets (e.g., shown by reference number 915) that cannot be recovered by decoding the set of encoded packets shown by reference number 925 may be recovered by decoding the set of encoded packets shown by reference number 935. In this way, retransmissions from remote UEs (e.g., the first UE 120 and/or the second UE 120 described above with respect to FIG. 8) can be reduced by recovering source packets by decoding encoded packets transmitted by the relay device.

As shown in FIG. 9 and example 910, information (e.g., data) included in a first V2X communication may be segmented into a set of source packets. Similarly, as shown by reference number 920, information (e.g., data) included in a second V2X communication may be segmented into a set of source packets. In example 910, the relay device may not combine the first V2X communication and the second V2X communication. The relay device may determine source packets associated with the first V2X (e.g., from encoded packets received from the first UE 120, as described above with respect to FIG. 8) and may encode the source packets to form a set of encoded packets associated with the first V2X communication. The relay device may form a set of encoded packets associated with the second V2X communication in a similar manner. The relay device may transmit the set of encoded packets associated with the first V2X communication and the set of encoded packets associated with the second V2X communication to a UE 120 (e.g., the third UE 120 described above with respect to FIG. 8) in separate transmissions.

As shown by reference number 940, the UE 120 (e.g., the third UE 120 described above with respect to FIG. 8) may receive a first set of encoded packets associated with the first V2X communication and the source packets shown by reference number 915 from another UE 120 (e.g., the first UE 120 described above with respect to FIG. 8). As shown by reference number 945, the UE 120 (e.g., the third UE 120 described above with respect to FIG. 8) may receive a second set of encoded packets associated with the first V2X communication and the source packets shown by reference number 915 from the relay device. As shown by reference number 950, the UE 120 (e.g., the third UE 120 described above with respect to FIG. 8) may receive a third set of encoded packets associated with the second V2X communication and the source packets shown by reference number 920 from another UE 120 (e.g., the second UE 120 described above with respect to FIG. 8). As shown by reference number 955, the UE 120 (e.g., the third UE 120 described above with respect to FIG. 8) may receive a fourth set of encoded packets associated with the second V2X communication and the source packets shown by reference number 920 from the relay device.

The UE 120 (e.g., the third UE 120 described above with respect to FIG. 8) may determine the source packets shown by reference number 915 by decoding the encoded packets shown by reference number 940 and 945. The UE 120 (e.g., the third UE 120 described above with respect to FIG. 8) may determine the source packets shown by reference number 920 by decoding the encoded packets shown by reference number 950 and 955. That is, any source packets (e.g., shown by reference number 915) that cannot be recovered by decoding the set of encoded packets shown by reference number 940 may be recovered by decoding the set of encoded packets shown by reference number 945. In this way, retransmissions from remote UEs (e.g., the first UE 120 and/or the second UE 120 described above with respect to FIG. 8) can be reduced by recovering source packets by decoding encoded packets transmitted by the relay device.

As indicated above, FIG. 9 is provided as an example. Other examples may differ from what is described with respect to FIG. 9.

Figure 10:
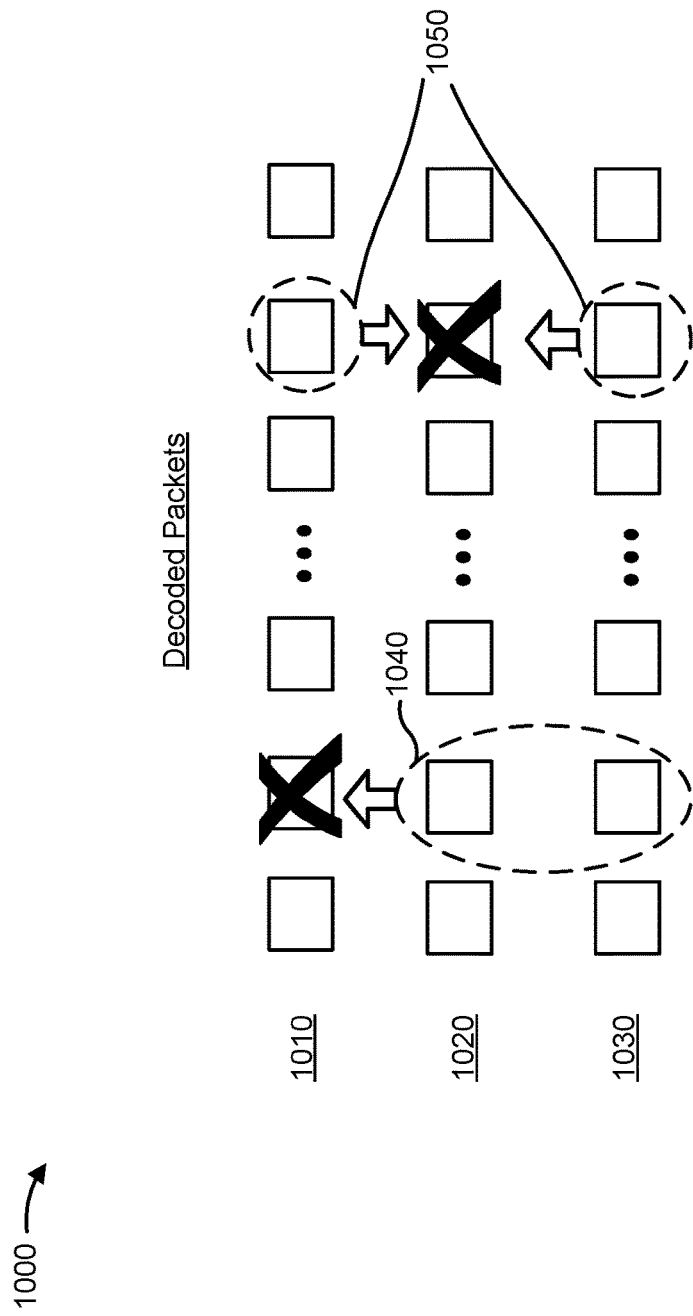

FIG. 10 is a diagram illustrating an example 1000 associated with V2X communications using network coding assisted by a relay, in accordance with various aspects of the present disclosure. As shown in FIG. 10, a UE 120, such as the third UE 120 described above with respect to FIG. 8, may decode encoded packets received from one or more other UEs 120 or a relay device. The decoded packets may be used by the UE 120 to determine source packets associated with one or more V2X communications.

As shown by reference number 1010, the UE 120 may decode a set of encoded packets received from another UE 120 (e.g., the first UE 120 described above with respect to FIG. 8) associated with a first V2X communication. As shown in FIG. 10, one or more source packets associated with the first V2X communication may not be successfully determined and/or decoded by the UE 120. For example, a link quality between the UE 120 and the other UE 120 may be poor. In some aspects, interference on a channel used by the UE 120 and the other UE 120 may cause one or more encoded packets to be unsuccessfully transmitted.

As shown by reference number 1020, the UE 120 may decode a set of encoded packets received from another UE 120 (e.g., the second UE 120 described above with respect to FIG. 8) associated with a second V2X communication. As shown in FIG. 10, one or more source packets associated with the second V2X communication may not be successfully determined and/or decoded by the UE 120. For example, a link quality between the UE 120 and the other UE 120 may be poor. In some aspects, interference on a channel used by the UE 120 and the other UE 120 may cause one or more encoded packets to be unsuccessfully transmitted.

As shown by reference number 1030 the UE 120 may decode a set of encoded packets received from a relay device. The set of encoded packets received from the relay device may be associated with a combined V2X communication. The combined V2X communication may be formed by combining source packets associated with the first V2X communication and source packets associated with the second V2X communication using an XOR operation. In some aspects, the relay device may continue to transmit encoded packets associated with the combined V2X communication until the UE 120 successfully receives and/or decodes the combined V2X communication (e.g., indicated by an ACK message transmitted by the UE 120 to the relay device).

As shown by reference number 1040, the UE 120 may recover a source packet associated with the first V2X communication that could not be determined by the UE 120 from the encoded packets transmitted by another UE 120 (e.g., the first UE 120 described above with respect to FIG. 8) by using the decoded packets shown by reference numbers 1020 and 1030. For example, the UE 120 may use decoded packets associated with the source packet associated with the first V2X communication that could not be determined by the UE 120 included in the decoded packets shown by reference numbers 1020 and 1030. As the combined V2X communication was formed using an XOR operation, the decoded packet associated with the combined V2X communication (shown by reference number 1030) may include the associated source packet of the second V2X communication (shown by reference number 1020) and the associated source packet of the first V2X communication (shown by reference number 1010). As a result, if the UE 120 determines the associated source packet of the second V2X communication and the associated source packet of the combined V2X communication, the UE 120 may determine the associated source packet of the first V2X communication. As a result, a retransmission from the other UE 120 (e.g., the first UE 120 described above with respect to FIG. 8) is not required to determine the information included in the first V2X communication.

As shown by reference number 1050, the UE 120 may recover a source packet associated with the second V2X communication that could not be determined by the UE 120 from the encoded packets transmitted by another UE 120 (e.g., the second UE 120 described above with respect to FIG. 8) by using the decoded packets shown by reference numbers 1010 and 1030. The UE 120 may determine the source packet associated with the second V2X communication that could not be determined by the UE 120 in a similar manner as described above with respect to reference number 1040 (e.g., using an associated source packet of the first V2X communication and an associated source packet of the combined V2X communication).

As indicated above, FIG. 10 is provided as an example. Other examples may differ from what is described with respect to FIG. 10.

Figure 11:
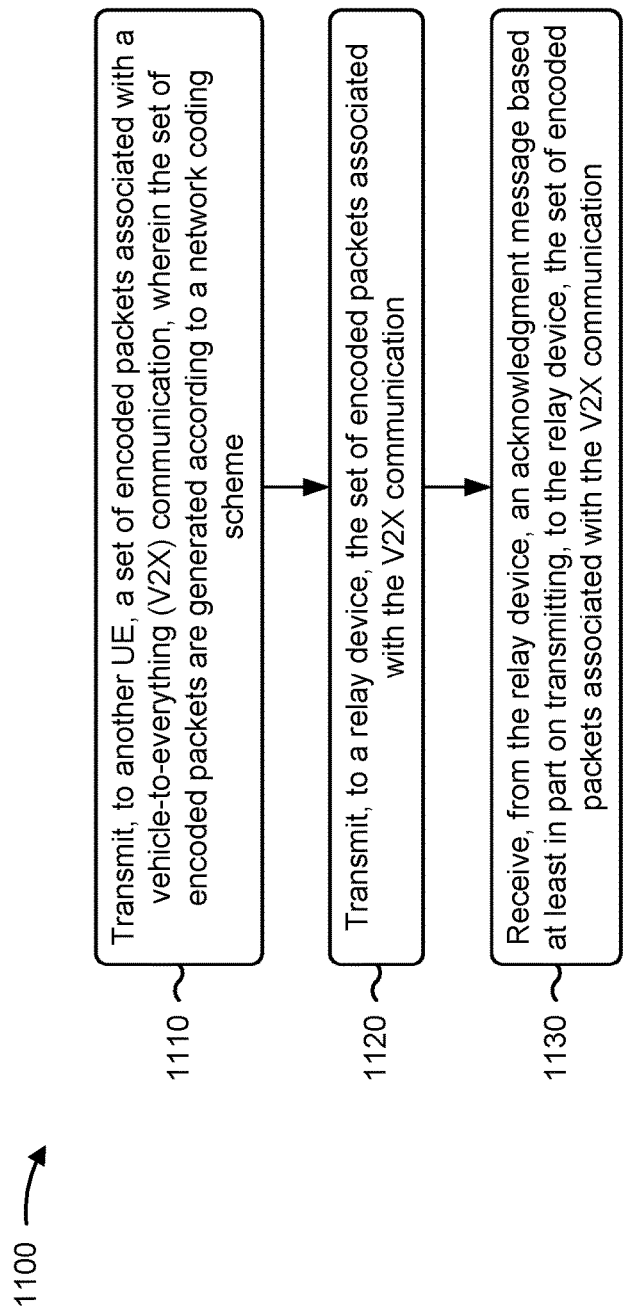
FIGS. 11-13 are diagrams illustrating example processes associated with V2X communications using network coding assisted by a relay, in accordance with various aspects of the present disclosure.

FIG. 11 is a diagram illustrating an example process 1100 performed, for example, by a user equipment (UE), in accordance with various aspects of the present disclosure. Example process 1100 is an example where the UE (e.g., UE 120 and/or the like) performs operations associated with V2X communications using network coding assisted by a relay.

As shown in FIG. 11, in some aspects, process 1100 may include transmitting, to another UE, a set of encoded packets associated with a V2X communication, wherein the set of encoded packets are generated according to a network coding scheme (block 1110). For example, the UE (e.g., using receive processor 258, transmit processor 264, controller/processor 280, memory 282, and/or the like) may transmit, to another UE, a set of encoded packets associated with a V2X communication. In some aspects, the set of encoded packets are generated according to a network coding scheme, as described above.

As further shown in FIG. 11, in some aspects, process 1100 may include transmitting, to a relay device, the set of encoded packets associated with the V2X communication (block 1120). For example, the UE (e.g., using receive processor 258, transmit processor 264, controller/processor 280, memory 282, and/or the like) may transmit, to a relay device, the set of encoded packets associated with the V2X communication, as described above.

As further shown in FIG. 11, in some aspects, process 1100 may include receiving, from the relay device, an acknowledgment message based at least in part on transmitting, to the relay device, the set of encoded packets associated with the V2X communication (block 1130). For example, the UE (e.g., using receive processor 258, transmit processor 264, controller/processor 280, memory 282, and/or the like) may receive, from the relay device, an acknowledgment message based at least in part on transmitting, to the relay device, the set of encoded packets associated with the V2X communication, as described above.

Process 1100 may include additional aspects, such as any single aspect or any combination of aspects described below and/or in connection with one or more other processes described elsewhere herein.

In a first aspect, process 1100 includes stopping the transmission, to the other UE, of the set of encoded packets associated with the V2X communication based at least in part on receiving the acknowledgement message from the relay device, and stopping the transmission, to the relay device, of the set of encoded packets associated with the V2X communication based at least in part on receiving the acknowledgement message from the relay device.

In a second aspect, alone or in combination with the first aspect, process 1100 includes segmenting a plurality of bits of the V2X communication to form a set of source packets, and encoding the set of source packets to form the set of encoded packets according to the network coding scheme.

In a third aspect, alone or in combination with one or more of the first and second aspects, the network coding scheme is a rateless network coding scheme.

In a fourth aspect, alone or in combination with one or more of the first through third aspects, the network coding scheme is at least one of a fountain network coding scheme, a Luby transform network coding scheme, or a Raptor network coding scheme.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
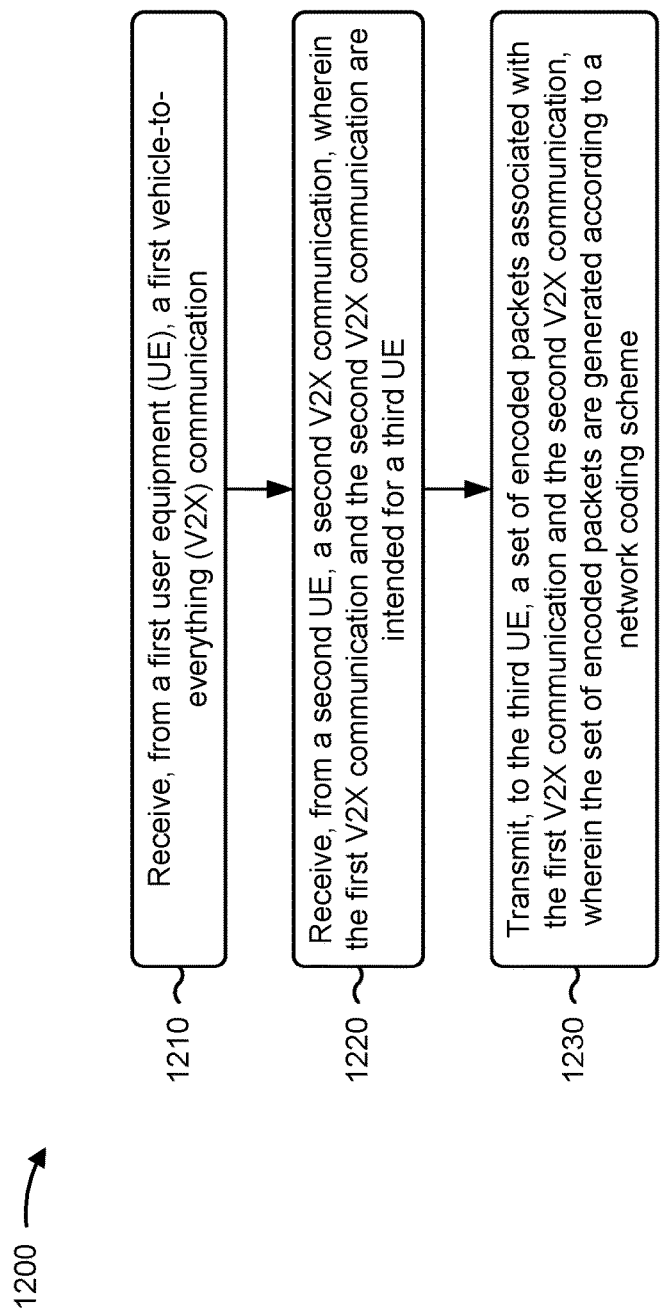

FIG. 12 is a diagram illustrating an example process 1200 performed, for example, by a relay device, in accordance with various aspects of the present disclosure. Example process 1200 is an example where the relay device (e.g., relay device 805 and/or the like) performs operations associated with V2X communications using network coding assisted by a relay.

As shown in FIG. 12, in some aspects, process 1200 may include receiving, from a first UE, a first V2X communication (block 1210). For example, the relay device (e.g., using receive processor 258, transmit processor 264, controller/processor 280, memory 282, receive processor 258, transmit processor 264, controller/processor 280, memory 282, antenna 234, DEMOD 232, MIMO detector 236, receive processor 238, controller/processor 240, transmit processor 220, TX MIMO processor 230, MOD 232, and/or the like, and/or the like) may receive, from a first user equipment (UE), a first vehicle-to-everything (V2X) communication, as described above.

As further shown in FIG. 12, in some aspects, process 1200 may include receiving, from a second UE, a second V2X communication, wherein the first V2X communication and the second V2X communication are intended for a third UE (block 1220). For example, the relay device (e.g., using receive processor 258, transmit processor 264, controller/processor 280, memory 282, receive processor 258, transmit processor 264, controller/processor 280, memory 282, antenna 234, DEMOD 232, MIMO detector 236, receive processor 238, controller/processor 240, transmit processor 220, TX MIMO processor 230, MOD 232, and/or the like, and/or the like) may receive, from a second UE, a second V2X communication, wherein the first V2X communication and the second V2X communication are intended for a third UE, as described above.

As further shown in FIG. 12, in some aspects, process 1200 may include transmitting, to the third UE, a set of encoded packets associated with the first V2X communication and the second V2X communication, wherein the set of encoded packets are generated according to a network coding scheme (block 1230). For example, the relay device (e.g., using receive processor 258, transmit processor 264, controller/processor 280, memory 282, receive processor 258, transmit processor 264, controller/processor 280, memory 282, antenna 234, DEMOD 232, MIMO detector 236, receive processor 238, controller/processor 240, transmit processor 220, TX MIMO processor 230, MOD 232, and/or the like, and/or the like) may transmit, to the third UE, a set of encoded packets associated with the first V2X communication and the second V2X communication, wherein the set of encoded packets are generated according to a network coding scheme, as described above.

Process 1200 may include additional aspects, such as any single aspect or any combination of aspects described below and/or in connection with one or more other processes described elsewhere herein.

In a first aspect, receiving, from the first UE, the first V2X communication comprises receiving, from the first UE, a set of encoded packets associated with the first V2X communication, wherein the set of encoded packets are generated according to a network coding scheme, decoding the set of encoded packets to form a set of source packets associated with the first V2X communication according to the network coding scheme, and transmitting, to the first UE, an acknowledgment message based at least in part on a determination that the set of source packets associated with the first V2X communication were determined from the set of encoded packets successfully.

In a second aspect, alone or in combination with the first aspect, receiving, from the second UE, the second V2X communication comprises receiving, from the second UE, a set of encoded packets associated with the second V2X communication, wherein the set of encoded packets are generated according to a network coding scheme, decoding the set of encoded packets to form a set of source packets associated with the second V2X communication according to the network coding scheme, and transmitting, to the second UE, an acknowledgment message based at least in part on a determination that the set of source packets associated with the second V2X communication were determined from the set of encoded packets successfully.

In a third aspect, alone or in combination with one or more of the first and second aspects, transmitting, to the third UE, the set of encoded packets associated with the first V2X communication and the second V2X communication comprises concatenating the first V2X communication and the second V2X communication to form a combined set of source packets associated with the first V2X communication and the second V2X communication, encoding the combined set of source packets, according to the network coding scheme, to form a combined set of encoded packets associated with the first V2X communication and the second V2X communication, and transmitting, to the third UE, the combined set of encoded packets associated with the first V2X communication and the second V2X communication.

In a fourth aspect, alone or in combination with one or more of the first through third aspects, transmitting, to the third UE, the set of encoded packets associated with the first V2X communication and the second V2X communication comprises encoding a set of source packets associated with the first V2X communication, according to the network coding scheme, to form a first set of encoded packets associated with the first V2X communication, transmitting, to the third UE, the first set of encoded packets associated with the first V2X communication until an acknowledgment message is received from the third UE, encoding a set of source packets associated with the second V2X communication, according to the network coding scheme, to form a second set of encoded packets associated with the second V2X communication, and transmitting, to the third UE, the second set of encoded packets associated with the second V2X communication until an acknowledgment message is received from the third UE.

In a fifth aspect, alone or in combination with one or more of the first through fourth aspects, transmitting, to the third UE, the set of encoded packets associated with the first V2X communication and the second V2X communication comprises combining the first V2X communication and the second V2X communication using an exclusive or operation to form a combined V2X communication, encoding a set of source packets associated with the combined V2X communication, according to the network coding scheme, to form a set of encoded packets associated with the combined V2X communication, and transmitting, to the third UE, the set of encoded packets associated with the combined V2X communication until an acknowledgment message is received by the relay device.

In a sixth aspect, alone or in combination with one or more of the first through fifth aspects, the relay device is a UE-to-UE relay device.

In a seventh aspect, alone or in combination with one or more of the first through sixth aspects, the relay device is a relay UE or a relay base station.

In an eighth aspect, alone or in combination with one or more of the first through seventh aspects, the network coding scheme is a rateless network coding scheme.

In a ninth aspect, alone or in combination with one or more of the first through eighth aspects, the network coding scheme is at least one of a fountain network coding scheme, a Luby transform network coding scheme, or a Raptor network coding scheme.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
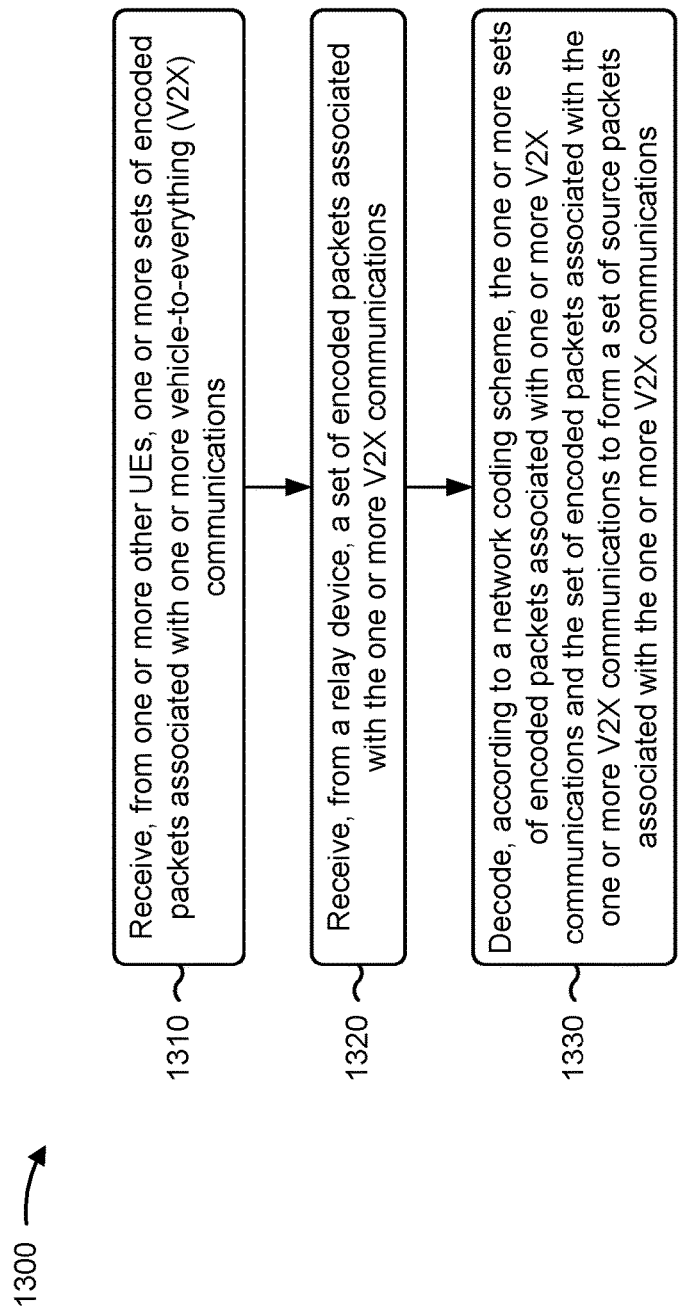

FIG. 13 is a diagram illustrating an example process 1300 performed, for example, by an UE, in accordance with various aspects of the present disclosure. Example process 1300 is an example where the UE (e.g., UE 120 and/or the like) performs operations associated with V2X communications using network coding assisted by a relay.

As shown in FIG. 13, in some aspects, process 1300 may include receiving, from one or more other UEs, one or more sets of encoded packets associated with one or more V2X communications (block 1310). For example, the UE (e.g., using receive processor 258, transmit processor 264, controller/processor 280, memory 282, and/or the like) may receive, from one or more other UEs, one or more sets of encoded packets associated with one or more V2X communications, as described above.

As further shown in FIG. 13, in some aspects, process 1300 may include receiving, from a relay device, a set of encoded packets associated with the one or more V2X communications (block 1320). For example, the UE (e.g., using receive processor 258, transmit processor 264, controller/processor 280, memory 282, and/or the like) may receive, from a relay device, a set of encoded packets associated with the one or more V2X communications, as described above.

As further shown in FIG. 13, in some aspects, process 1300 may include decoding, according to a network coding scheme, the one or more sets of encoded packets associated with one or more V2X communications and the set of encoded packets associated with the one or more V2X communications to form a set of source packets associated with the one or more V2X communications (block 1330). For example, the UE (e.g., using receive processor 258, transmit processor 264, controller/processor 280, memory 282, and/or the like) may decode, according to a network coding scheme, the one or more sets of encoded packets associated with one or more V2X communications and the set of encoded packets associated with the one or more V2X communications to form a set of source packets associated with the one or more V2X communications, as described above.

Process 1300 may include additional aspects, such as any single aspect or any combination of aspects described below and/or in connection with one or more other processes described elsewhere herein.

In a first aspect, the UE is a first UE, and receiving, from one or more other UEs, the one or more sets of encoded packets associated with the one or more V2X communications comprises receiving, from a second UE, a first set of encoded packets associated with a first V2X communication, and receiving, from a third UE, a second set of encoded packets associated with a second V2X communication.

In a second aspect, alone or in combination with the first aspect, receiving, from the relay device, the set of encoded packets associated with the one or more V2X communications comprises receiving, from the relay device, a set of encoded packets associated with a combined set of source packets associated with a first V2X communication and a second V2X communication, wherein the combined set of source packets were formed by concatenating the first V2X communication and the second V2X communication.

In a third aspect, alone or in combination with one or more of the first and second aspects, the UE is a first UE, and decoding, according to the network coding scheme, the one or more sets of encoded packets associated with one or more V2X communications and the set of encoded packets associated with the one or more V2X communications to form the set of source packets associated with the one or more V2X communications comprises decoding a first set of encoded packets, received from a second UE, associated with the first V2X communication to form a set of source packets associated with the first V2X communication, decoding a second set of encoded packets, received from a third UE, associated with the second V2X communication to form a set of source packets associated with the second V2X communication, and decoding the set of encoded packets, received from the relay device, associated with the combined set of source packets associated with the first V2X communication and the second V2X communication to form a set of source packets associated with the first V2X communication and the second V2X communication.

In a fourth aspect, alone or in combination with one or more of the first through third aspects, process 1300 includes determining information included in the first V2X communication from at least one of the set of source packets associated with the first V2X communication or the set of source packets associated with the first V2X communication and the second V2X communication.

In a fifth aspect, alone or in combination with one or more of the first through fourth aspects, process 1300 includes determining information included in the second V2X communication from at least one of the set of source packets associated with the second V2X communication or the set of source packets associated with the first V2X communication and the second V2X communication.

In a sixth aspect, alone or in combination with one or more of the first through fifth aspects, receiving, from the relay device, the set of encoded packets associated with the one or more V2X communications comprises receiving a set of encoded packets associated with a first V2X communication, and receiving a set of encoded packets associated with a second V2X communication.

In a seventh aspect, alone or in combination with one or more of the first through sixth aspects, the UE is a first UE, and decoding, according to the network coding scheme, the one or more sets of encoded packets associated with one or more V2X communications and the set of encoded packets associated with the one or more V2X communications to form the set of source packets associated with the one or more V2X communications comprises decoding a set of encoded packets, received from a second UE, associated with the first V2X communication to form a first set of source packets associated with the first V2X communication, decoding the set of encoded packets, received from the relay device, associated with the first V2X communication to form a second set of source packets associated with the first V2X communication, decoding a set of encoded packets, received from a third UE, associated with the second V2X communication to form a first set of source packets associated with the second V2X communication, and decoding the set of encoded packets, received from the relay device, associated with the second V2X communication to form a second set of source packets associated with the second V2X communication.

In an eighth aspect, alone or in combination with one or more of the first through seventh aspects, process 1300 includes determining information included in the first V2X communication from at least one of the first set of source packets associated with the first V2X communication or the second set of source packets associated with the first V2X communication.

In a ninth aspect, alone or in combination with one or more of the first through eighth aspects, process 1300 includes determining information included in the second V2X communication from at least one of the first set of source packets associated with the second V2X communication or the second set of source packets associated with the second V2X communication.

In a tenth aspect, alone or in combination with one or more of the first through ninth aspects, receiving, from the relay device, the set of encoded packets associated with the one or more V2X communications comprises receiving from the relay device, a set of encoded packets associated with a combined V2X communication, wherein the combined V2X communication is formed by combining a first V2X communication and a second V2X communication using an exclusive or operation.

In an eleventh aspect, alone or in combination with one or more of the first through tenth aspects, the UE is a first UE, and decoding, according to the network coding scheme, the one or more sets of encoded packets associated with one or more V2X communications and the set of encoded packets associated with the one or more V2X communications to form the set of source packets associated with the one or more V2X communications comprises decoding a set of encoded packets, received from a second UE, associated with the first V2X communication to form a set of source packets associated with the first V2X communication, decoding a set of encoded packets, received from a third UE, associated with the second V2X communication to form a set of source packets associated with the second V2X communication, and decoding the set of encoded packets, received from the relay device, associated with the combined V2X communication to form a set of source packets associated with the combined V2X communication.

In a twelfth aspect, alone or in combination with one or more of the first through eleventh aspects, the set of source packets associated with the first V2X communication is a partial set of source packets associated with the first V2X communication, and the set of source packets associated with the second V2X communication is a partial set of source packets associated with the second V2X communication.

In a thirteenth aspect, alone or in combination with one or more of the first through twelfth aspects, process 1300 includes determining that the UE failed to determine one or more source packets included in the set of source packets associated with the first V2X communication, and recovering a source packet, of the one or more source packets that the UE failed to determine, using the set of source packets associated with the second V2X communication and the set of source packets associated with the combined V2X communication.

In a fourteenth aspect, alone or in combination with one or more of the first through thirteenth aspects, process 1300 includes determining that the UE failed to determine one or more source packets included in the set of source packets associated with the second V2X communication, and recovering a source packet, of the one or more source packets that the UE failed to determine, using the set of source packets associated with the first V2X communication and the set of source packets associated with the combined V2X communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
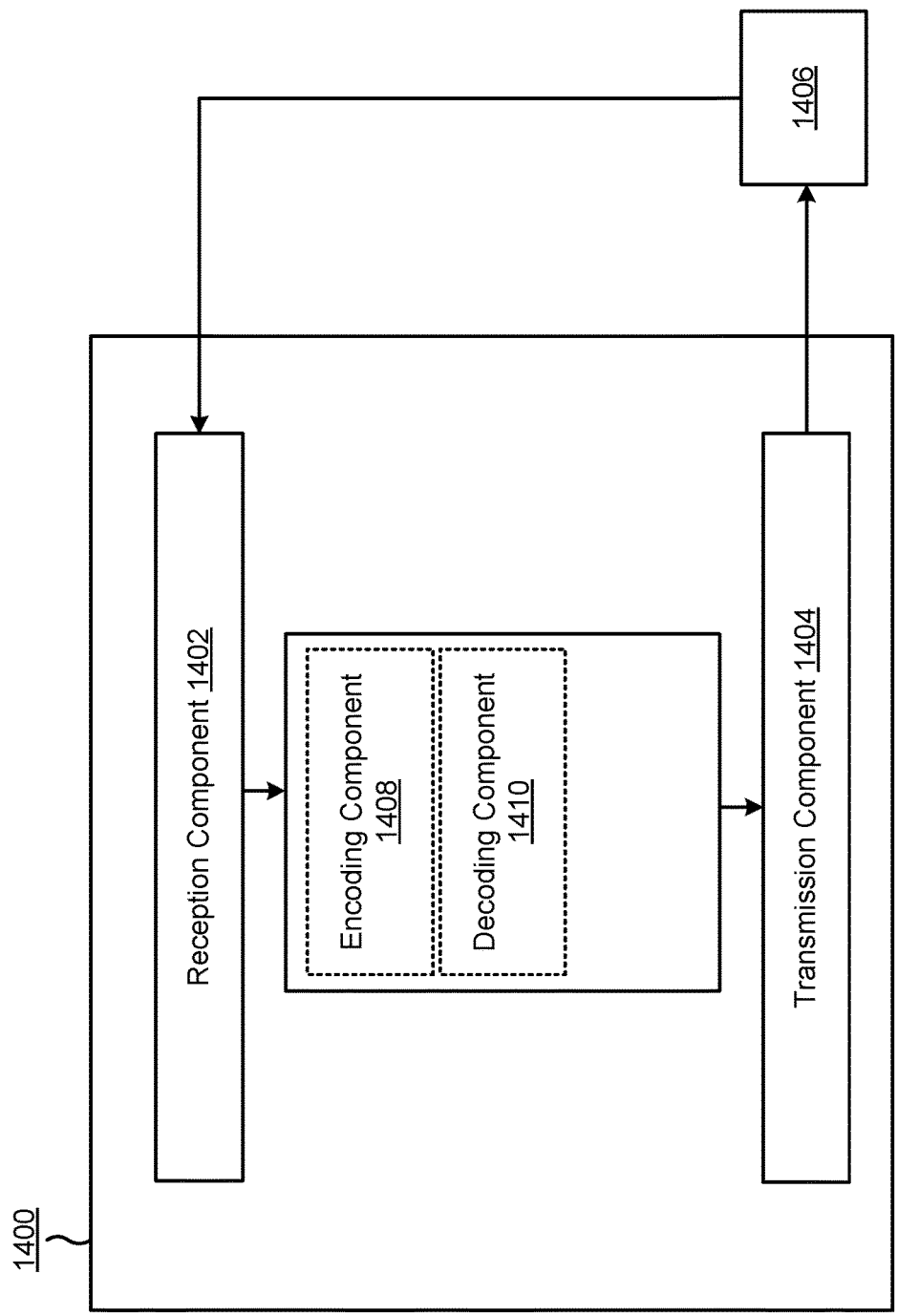
FIGS. 14-15 are block diagrams of example apparatuses for wireless communication, in accordance with various aspects of the present disclosure.

FIG. 14 is a block diagram of an example apparatus 1400 for wireless communication. The apparatus 1400 may be a user equipment, or a user equipment may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of an encoding component 1408, a decoding component 1410, among other examples.

In some aspects, the apparatus 1400 may be configured to perform one or more operations described herein in connection with FIGS. 8-10. Additionally or alternatively, the apparatus 1400 may be configured to perform one or more processes described herein, such as process 1100 of FIG. 11, process 1300 of FIG. 13, or a combination thereof. In some aspects, the apparatus 1400 and/or one or more components shown in FIG. 14 may include one or more components of the user equipment described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the user equipment described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the user equipment described above in connection with FIG. 2. In some aspects, the transmission component 1404 may be collocated with the reception component 1402 in a transceiver.

The transmission component 1404 may transmit, to another UE, a set of encoded packets associated with a V2X communication, wherein the set of encoded packets are generated according to a network coding scheme. The transmission component 1404 may transmit, to a relay device, the set of encoded packets associated with the V2X communication. The reception component 1402 may receive, from the relay device, an acknowledgment message based at least in part on transmitting, to the relay device, the set of encoded packets associated with the V2X communication. The encoding component 1408 may encode a set of source packets associated with the V2X communication to form the set of encoded packets according to the network coding scheme.

The reception component 1402 may receive, from one or more other UEs, one or more sets of encoded packets associated with one or more V2X communications. The reception component 1402 may receive, from a relay device, a set of encoded packets associated with the one or more V2X communications. The decoding component 1410 may decode, according to a network coding scheme, the one or more sets of encoded packets associated with one or more V2X communications and the set of encoded packets associated with the one or more V2X communications to form a set of source packets associated with the one or more V2X communications.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
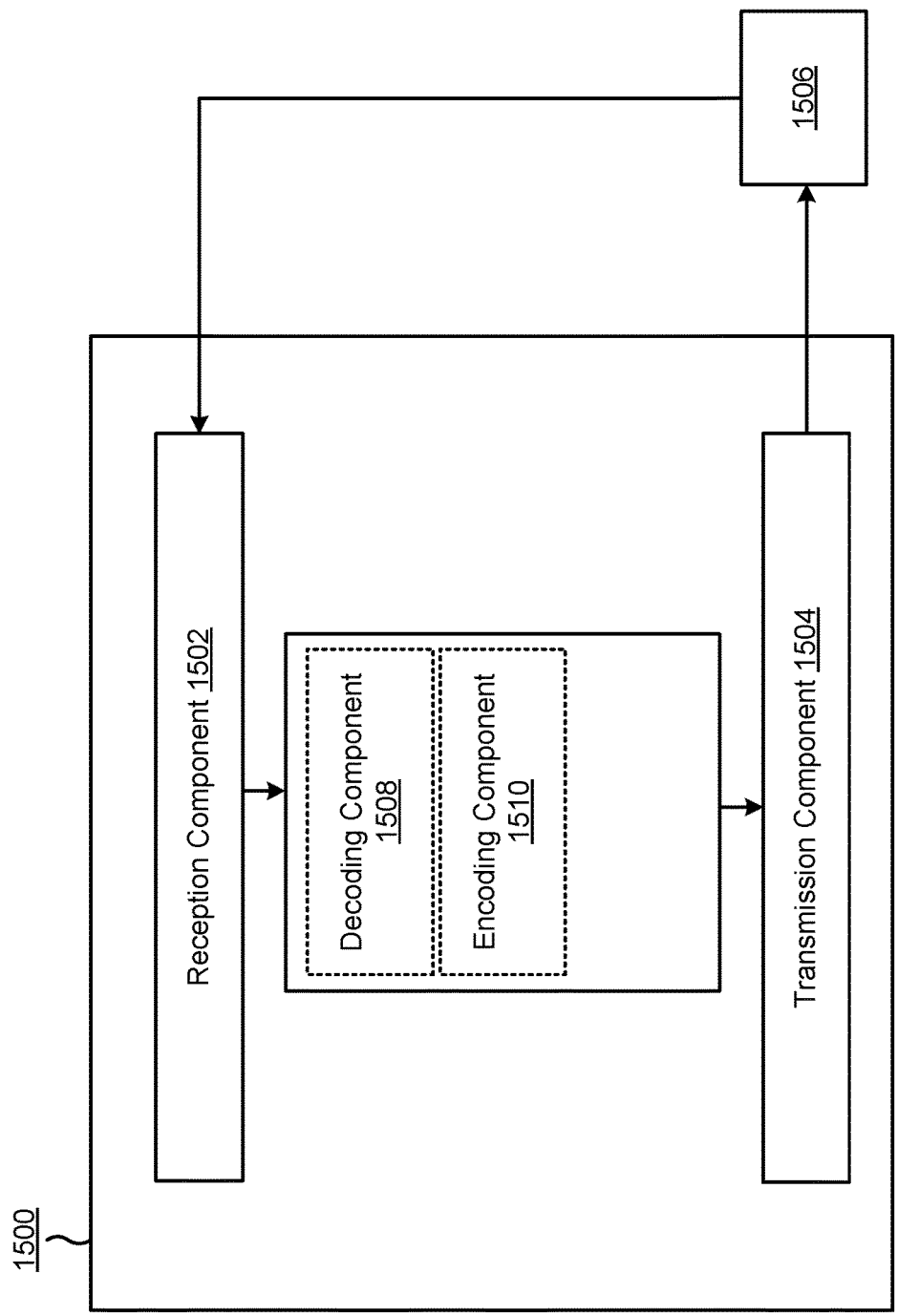

FIG. 15 is a block diagram of an example apparatus 1500 for wireless communication. The apparatus 1500 may be a relay device, or a relay device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a decoding component 1508, an encoding component 1510, among other examples.

In some aspects, the apparatus 1500 may be configured to perform one or more operations described herein in connection with FIGS. 8-10. Additionally or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the relay device described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE or base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the relay device described above in connection with FIG. 2. In some aspects, the transmission component 1504 may be collocated with the reception component 1502 in a transceiver.

The reception component 1502 may receive, from a first UE, a first V2X communication. The reception component 1502 may receive, from a second UE, a second V2X communication, wherein the first V2X communication and the second V2X communication are intended for a third UE. The transmission component 1504 may transmit, to the third UE, a set of encoded packets associated with the first V2X communication and the second V2X communication, wherein the set of encoded packets are generated according to a network coding scheme. The decoding component 1508 may decode a set of encoded packets associated with the first V2X communication. The decoding component 1508 may decode a set of encoded packets associated with the second V2X communication. The encoding component 1510 may encode a set of source packets associated with the first V2X communication and associated with the second V2X communication to form the set of encoded packets associated with the first V2X communication and the second V2X communication.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to another UE, a set of encoded packets associated with a vehicle-to-everything (V2X) communication, wherein the set of encoded packets are generated according to a network coding scheme;
    transmitting, to a relay device, the set of encoded packets associated with the V2X communication;
    receiving, from the relay device, an acknowledgment message based at least in part on transmitting, to the relay device, the set of encoded packets associated with the V2X communication;
    stopping the transmission, to the other UE, of the set of encoded packets associated with the V2X communication based at least in part on receiving the acknowledgement message from the relay device; and
    stopping the transmission, to the relay device, of the set of encoded packets associated with the V2X communication based at least in part on receiving the acknowledgement message from the relay device.

2. The method of claim 1, wherein the network coding scheme is at least one of:
    a fountain network coding scheme,
    a Luby transform network coding scheme, or
    a Raptor network coding scheme.

3. The method of claim 1, further comprising:
- segmenting a plurality of bits of the V2X communication to form a set of source packets; and
- encoding the set of source packets to form the set of encoded packets according to the network coding scheme.

4. The method of claim 1, wherein the network coding scheme is a rateless network coding scheme.

5. A user equipment (UE) for wireless communication, comprising:
- a memory; and
- one or more processors operatively coupled to the memory, the memory and the one or more processors configured to:
  - transmit, to another UE, a set of encoded packets associated with a vehicle-to-everything (V2X) communication, wherein the set of encoded packets are generated according to a network coding scheme;
  - transmit, to a relay device, the set of encoded packets associated with the V2X communication; and
  - receive, from the relay device, an acknowledgment message based at least in part on transmitting, to the relay device, the set of encoded packets associated with the V2X communication;
  - stop the transmission, to the other UE, of the set of encoded packets associated with the V2X communication based at least in part on receiving the acknowledgement message from the relay device; and
  - stop the transmission, to the relay device, of the set of encoded packets associated with the V2X communication based at least in part on receiving the acknowledgement message from the relay device.

6. A method of wireless communication performed by a relay device, comprising:
- receiving, from a first user equipment (UE), a first vehicle-to-everything (V2X) communication;
- receiving, from a second UE, a second V2X communication, wherein the first V2X communication and the second V2X communication are intended for a third UE;
- transmitting, to the third UE, a set of encoded packets associated with the first V2X communication and the second V2X communication, wherein the set of encoded packets are generated according to a network coding scheme;
- receiving, from the first UE, a set of encoded packets associated with the first V2X communication, wherein the set of encoded packets are generated according to a network coding scheme;
- decoding the set of encoded packets to form a set of source packets associated with the first V2X communication according to the network coding scheme; and
- transmitting, to the first UE, an acknowledgment message based at least in part on a determination that the set of source packets associated with the first V2X communication were determined from the set of encoded packets successfully.

7. The method of claim 6, wherein the network coding scheme is at least one of:
- a fountain network coding scheme,
- a Luby transform network coding scheme, or
- a Raptor network coding scheme.

8. The method of claim 6, wherein receiving, from the second UE, the second V2X communication comprises:
- receiving, from the second UE, a set of encoded packets associated with the second V2X communication, wherein the set of encoded packets are generated according to a network coding scheme;
- decoding the set of encoded packets to form a set of source packets associated with the second V2X communication according to the network coding scheme; and
- transmitting, to the second UE, an acknowledgment message based at least in part on a determination that the set of source packets associated with the second V2X communication were determined from the set of encoded packets successfully.

9. The method of claim 6, wherein transmitting, to the third UE, the set of encoded packets associated with the first V2X communication and the second V2X communication comprises:
- concatenating the first V2X communication and the second V2X communication to form a combined set of source packets associated with the first V2X communication and the second V2X communication;
- encoding the combined set of source packets, according to the network coding scheme, to form a combined set of encoded packets associated with the first V2X communication and the second V2X communication; and
- transmitting, to the third UE, the combined set of encoded packets associated with the first V2X communication and the second V2X communication.

10. The method of claim 6, wherein transmitting, to the third UE, the set of encoded packets associated with the first V2X communication and the second V2X communication comprises:
- encoding a set of source packets associated with the first V2X communication, according to the network coding scheme, to form a first set of encoded packets associated with the first V2X communication;
- transmitting, to the third UE, the first set of encoded packets associated with the first V2X communication until an acknowledgment message is received from the third UE;
- encoding a set of source packets associated with the second V2X communication, according to the network coding scheme, to form a second set of encoded packets associated with the second V2X communication; and
- transmitting, to the third UE, the second set of encoded packets associated with the second V2X communication until an acknowledgment message is received from the third UE.

11. The method of claim 6, wherein transmitting, to the third UE, the set of encoded packets associated with the first V2X communication and the second V2X communication comprises:
- combining the first V2X communication and the second V2X communication using an exclusive or operation to form a combined V2X communication;
- encoding a set of source packets associated with the combined V2X communication, according to the network coding scheme, to form a set of encoded packets associated with the combined V2X communication; and
- transmitting, to the third UE, the set of encoded packets associated with the combined V2X communication until an acknowledgment message is received by the relay device.

12. The method of claim 6, wherein the relay device is a UE-to-UE relay device.

13. The method of claim 6, wherein the relay device is a relay UE or a relay base station.

14. The method of claim 6, wherein the network coding scheme is a rateless network coding scheme.

15. A relay device for wireless communication, comprising:
a memory; and
one or more processors operatively coupled to the memory, the memory and the one or more processors configured to:
receive, from a first user equipment (UE), a first vehicle-to-everything (V2X) communication;
receive, from a second UE, a second V2X communication, wherein the first V2X communication and the second V2X communication are intended for a third UE; and
transmit, to the third UE, a set of encoded packets associated with the first V2X communication and the second V2X communication, wherein the set of encoded packets are generated according to a network coding scheme;
receive, from the first UE, a set of encoded packets associated with the first V2X communication, wherein the set of encoded packets are generated according to a network coding scheme;
decode the set of encoded packets to form a set of source packets associated with the first V2X communication according to the network coding scheme; and
transmit, to the first UE, an acknowledgment message based at least in part on a determination that the set of source packets associated with the first V2X communication were determined from the set of encoded packets successfully.

16. A method of wireless communication performed by a user equipment (UE), comprising:
receiving, from one or more other UEs, one or more sets of encoded packets associated with one or more vehicle-to-everything (V2X) communications;
receiving, from a relay device, a set of encoded packets associated with the one or more V2X communications; and
decoding, according to a network coding scheme, the one or more sets of encoded packets associated with one or more V2X communications and the set of encoded packets associated with the one or more V2X communications to form a set of source packets associated with the one or more V2X communications,
wherein the UE is a first UE, and wherein receiving, from one or more other UEs, the one or more sets of encoded packets associated with the one or more V2X communications comprises:
receiving, from a second UE, a first set of encoded packets associated with a first V2X communication; and
receiving, from a third UE, a second set of encoded packets associated with a second V2X communication.

17. The method of claim 16, wherein receiving, from the relay device, the set of encoded packets associated with the one or more V2X communications comprises:
receiving, from the relay device, a set of encoded packets associated with a combined V2X communication, wherein the combined V2X communication is formed, by the relay device, by combining a first V2X communication and a second V2X communication using an exclusive or operation.

18. The method of claim 17, wherein the UE is a first UE, and wherein decoding, according to the network coding scheme, the one or more sets of encoded packets associated with one or more V2X communications and the set of encoded packets associated with the one or more V2X communications to form the set of source packets associated with the one or more V2X communications comprises:
decoding a set of encoded packets, received from a second UE, associated with the first V2X communication to form a set of source packets associated with the first V2X communication;
decoding a set of encoded packets, received from a third UE, associated with the second V2X communication to form a set of source packets associated with the second V2X communication; and
decoding the set of encoded packets, received from the relay device, associated with the combined V2X communication to form a set of source packets associated with the combined V2X communication.

19. The method of claim 18, wherein the set of source packets associated with the first V2X communication is a partial set of source packets associated with the first V2X communication; and
wherein the set of source packets associated with the second V2X communication is a partial set of source packets associated with the second V2X communication.

20. The method of claim 18, further comprising:
determining that the UE failed to determine one or more source packets included in the set of source packets associated with the first V2X communication; and
recovering a source packet, of the one or more source packets that the UE failed to determine, using the set of source packets associated with the second V2X communication and the set of source packets associated with the combined V2X communication.

21. The method of claim 18, further comprising:
determining that the UE failed to determine one or more source packets included in the set of source packets associated with the second V2X communication; and
recovering a source packet, of the one or more source packets that the UE failed to determine, using the set of source packets associated with the first V2X communication and the set of source packets associated with the combined V2X communication.

22. The method of claim 16, wherein receiving, from the relay device, the set of encoded packets associated with the one or more V2X communications comprises:
receiving a set of encoded packets associated with a first V2X communication; and
receiving a set of encoded packets associated with a second V2X communication.

23. The method of claim 22, wherein the UE is a first UE, and wherein decoding, according to the network coding scheme, the one or more sets of encoded packets associated with one or more V2X communications and the set of encoded packets associated with the one or more V2X communications to form the set of source packets associated with the one or more V2X communications comprises:
decoding a set of encoded packets, received from a second UE, associated with the first V2X communication to form a first set of source packets associated with the first V2X communication;
decoding the set of encoded packets, received from the relay device, associated with the first V2X communication to form a second set of source packets associated with the first V2X communication;
decoding a set of encoded packets, received from a third UE, associated with the second V2X communication to form a first set of source packets associated with the second V2X communication; and decoding the set of encoded packets, received from the relay device, associated with the second V2X communication to form a second set of source packets associated with the second V2X communication.

24. The method of claim 23, further comprising:
determining information included in the first V2X communication from at least one of the first set of source packets associated with the first V2X communication or the second set of source packets associated with the first V2X communication.

25. The method of claim 23, further comprising:
determining information included in the second V2X communication from at least one of the first set of source packets associated with the second V2X communication or the second set of source packets associated with the second V2X communication.

26. The method of claim 16, wherein receiving, from the relay device, the set of encoded packets associated with the one or more V2X communications comprises:
receiving, from the relay device, a set of encoded packets associated with a combined set of source packets associated with a first V2X communication and a second V2X communication, wherein the combined set of source packets were formed by concatenating the first V2X communication and the second V2X communication.

27. The method of claim 26, wherein the UE is a first UE, and wherein decoding, according to the network coding scheme, the one or more sets of encoded packets associated with one or more V2X communications and the set of encoded packets associated with the one or more V2X communications to form the set of source packets associated with the one or more V2X communications comprises:
decoding a first set of encoded packets, received from a second UE, associated with the first V2X communication to form a set of source packets associated with the first V2X communication;
decoding a second set of encoded packets, received from a third UE, associated with the second V2X communication to form a set of source packets associated with the second V2X communication; and
decoding the set of encoded packets, received from the relay device, associated with the combined set of source packets associated with the first V2X communication and the second V2X communication to form a set of source packets associated with the first V2X communication and the second V2X communication.

28. The method of claim 27, further comprising:
determining information included in the first V2X communication from at least one of the set of source packets associated with the first V2X communication or the set of source packets associated with the first V2X communication and the second V2X communication.

29. The method of claim 27, further comprising:
determining information included in the second V2X communication from at least one of the set of source packets associated with the second V2X communication or the set of source packets associated with the first V2X communication and the second V2X communication.

30. A user equipment (UE) for wireless communication, comprising:
a memory; and
one or more processors operatively coupled to the memory, the memory and the one or more processors configured to:
receive, from one or more other UEs, one or more sets of encoded packets associated with one or more vehicle-to-everything (V2X) communications;
receive, from a relay device, a set of encoded packets associated with the one or more V2X communications; and
decode, according to a network coding scheme, the one or more sets of encoded packets associated with one or more V2X communications and the set of encoded packets associated with the one or more V2X communications to form a set of source packets associated with the one or more V2X communications;
wherein the UE is a first UE, and wherein receiving, from one or more other UEs, the one or more sets of encoded packets associated with the one or more V2X communications comprises:
receiving, from a second UE, a first set of encoded packets associated with a first V2X communication; and
receiving, from a third UE, a second set of encoded packets associated with a second V2X communication.

* * * * *